United States Patent
Kato

(10) Patent No.: US 9,400,357 B2
(45) Date of Patent: Jul. 26, 2016

(54) OPTICAL CONNECTOR

(71) Applicant: FUJIKURA LTD., Tokyo (JP)

(72) Inventor: Seiji Kato, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 14/619,335

(22) Filed: Feb. 11, 2015

(65) Prior Publication Data

US 2015/0346438 A1 Dec. 3, 2015

(30) Foreign Application Priority Data

May 30, 2014 (JP) .................................. 2014-113187

(51) Int. Cl.
G02B 6/38 (2006.01)

(52) U.S. Cl.
CPC .............. *G02B 6/3897* (2013.01); *G02B 6/387* (2013.01); *G02B 6/3826* (2013.01); *G02B 6/3874* (2013.01); *G02B 6/3893* (2013.01)

(58) Field of Classification Search
CPC ........... G02B 6/38; G02B 6/3897; G02B 6/00
USPC ........................................................... 385/59
See application file for complete search history.

(56) References Cited

U.S. PATENT DOCUMENTS

| | | | | |
|---|---|---|---|---|
| 5,121,454 A | * | 6/1992 | Iwano et al. ...................... | 385/60 |
| 5,481,634 A | * | 1/1996 | Anderson et al. ................ | 385/76 |
| 5,528,711 A | * | 6/1996 | Iwano et al. ...................... | 385/56 |
| 5,537,501 A | * | 7/1996 | Iwano et al. ...................... | 385/58 |
| 5,563,978 A | * | 10/1996 | Kawahara et al. ............. | 385/136 |
| 5,671,310 A | * | 9/1997 | Lin et al. .......................... | 385/78 |
| 5,673,346 A | * | 9/1997 | Iwano et al. ..................... | 385/60 |
| 5,719,977 A | * | 2/1998 | Lampert et al. ................. | 385/60 |
| 5,774,611 A | * | 6/1998 | Nagase et al. ................... | 385/58 |
| 6,102,581 A | * | 8/2000 | Deveau et al. .................. | 385/56 |
| 6,104,856 A | * | 8/2000 | Lampert ...................... | 385/140 |
| 2003/0215190 A1 | * | 11/2003 | Lampert et al. ................. | 385/77 |
| 2004/0072454 A1 | * | 4/2004 | Nakajima et al. ............... | 439/79 |
| 2005/0281509 A1 | * | 12/2005 | Cox et al. ......................... | 385/59 |
| 2007/0025665 A1 | * | 2/2007 | Dean et al. ....................... | 385/78 |
| 2010/0290741 A1 | * | 11/2010 | Lu et al. ........................... | 385/60 |
| 2010/0310213 A1 | * | 12/2010 | Lewallen et al. ................ | 385/75 |
| 2012/0027359 A1 | * | 2/2012 | Katoh ............................... | 385/78 |
| 2014/0023326 A1 | * | 1/2014 | Anderson et al. ............... | 385/78 |
| 2014/0133807 A1 | * | 5/2014 | Katoh ............................... | 385/78 |

FOREIGN PATENT DOCUMENTS

JP 05-045541 A 2/1993

OTHER PUBLICATIONS

JIS C 598, F12 Type Connectors for optical fiber ribbons (MT connectors).
Document to be submitted for the certificate for the application of Exception to Lack of Novelty.

* cited by examiner

*Primary Examiner* — Kaveh C Kianni
(74) *Attorney, Agent, or Firm* — Sughrue Mion, PLLC

(57) ABSTRACT

An optical connector includes a first housing, a first ferrule which is embedded in the first housing, a second housing which is detachably fitted to the first housing; and a second ferrule which is embedded in the second housing and is butt-jointed to the first ferrule when the second housing is fitted to the first housing, and the first housing includes a tubular outer housing, and a tubular inner housing which is accommodated in the outer housing to be movable in a center axis direction of the outer housing and which accommodates the first ferrule.

7 Claims, 14 Drawing Sheets

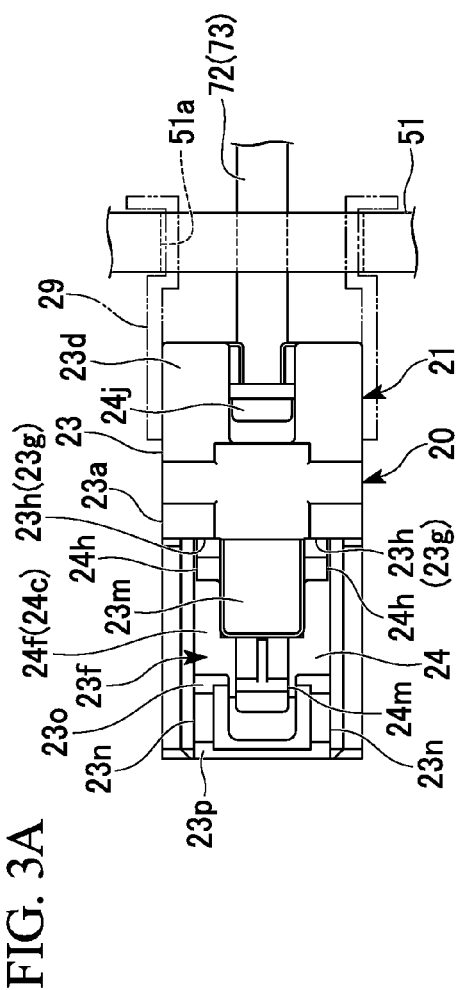
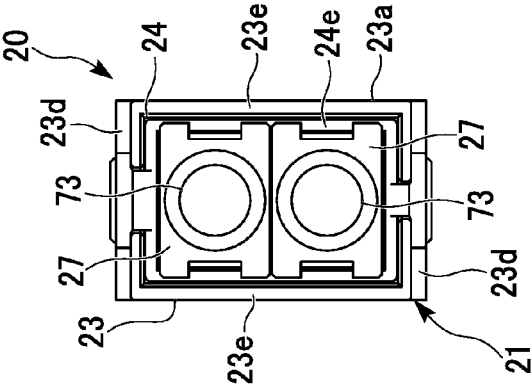
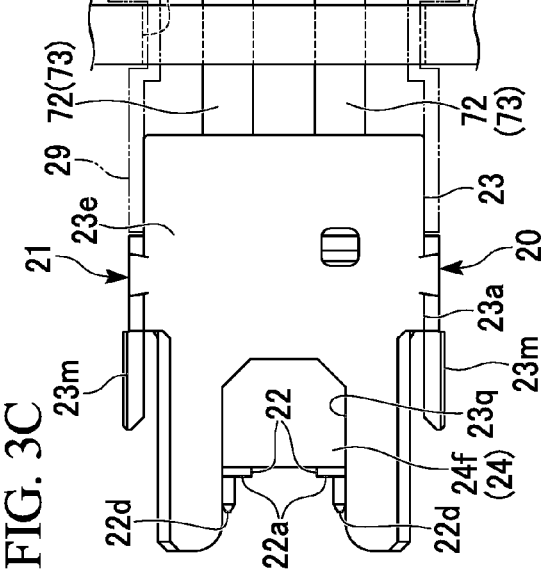
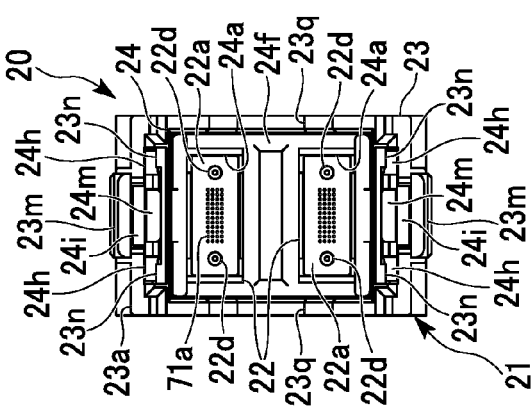

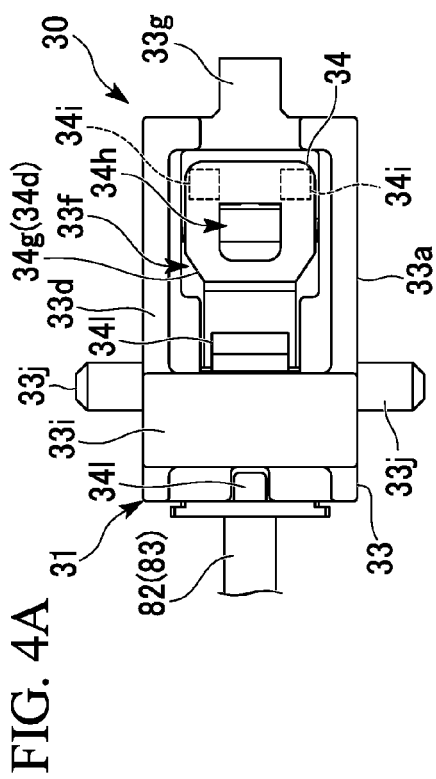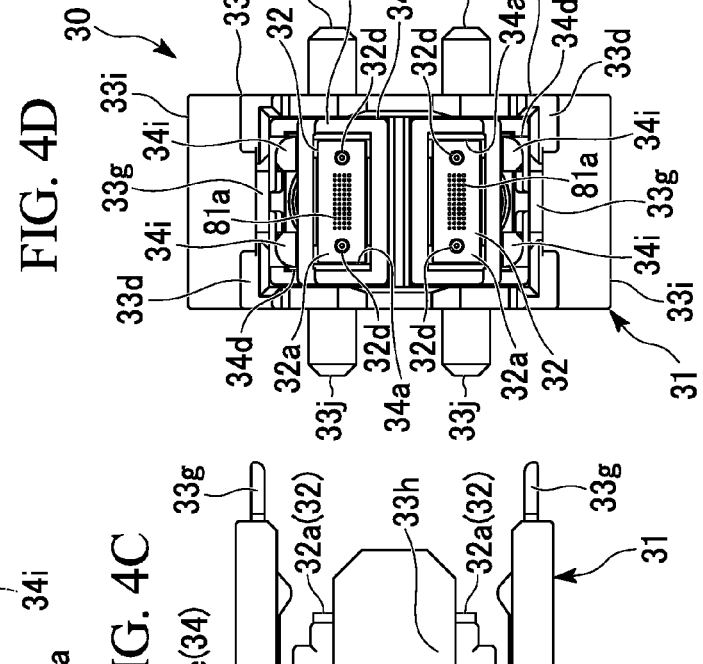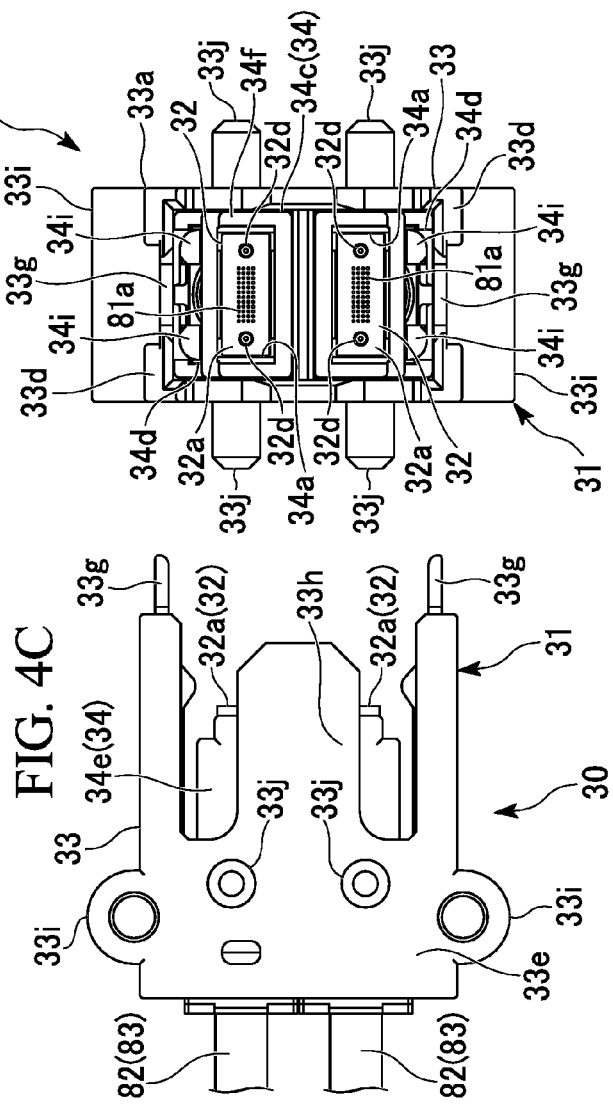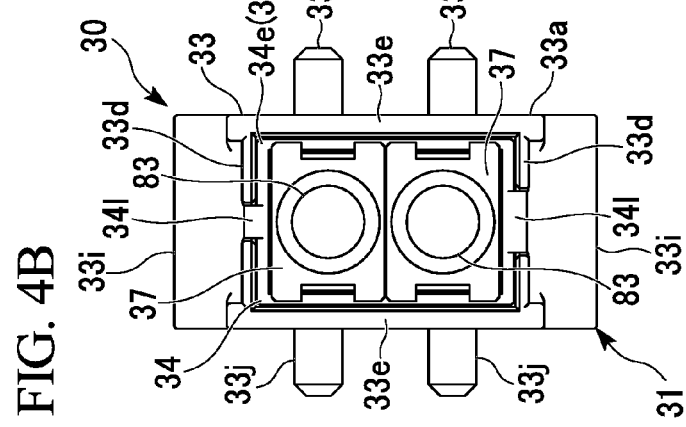

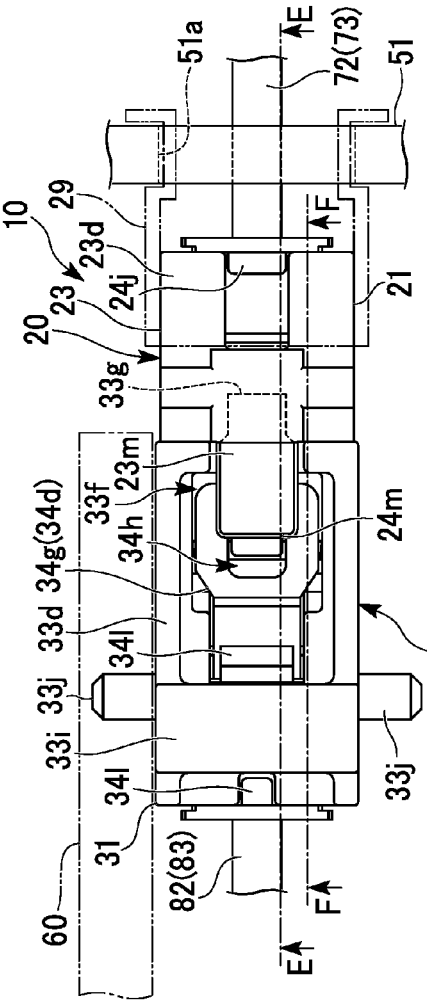
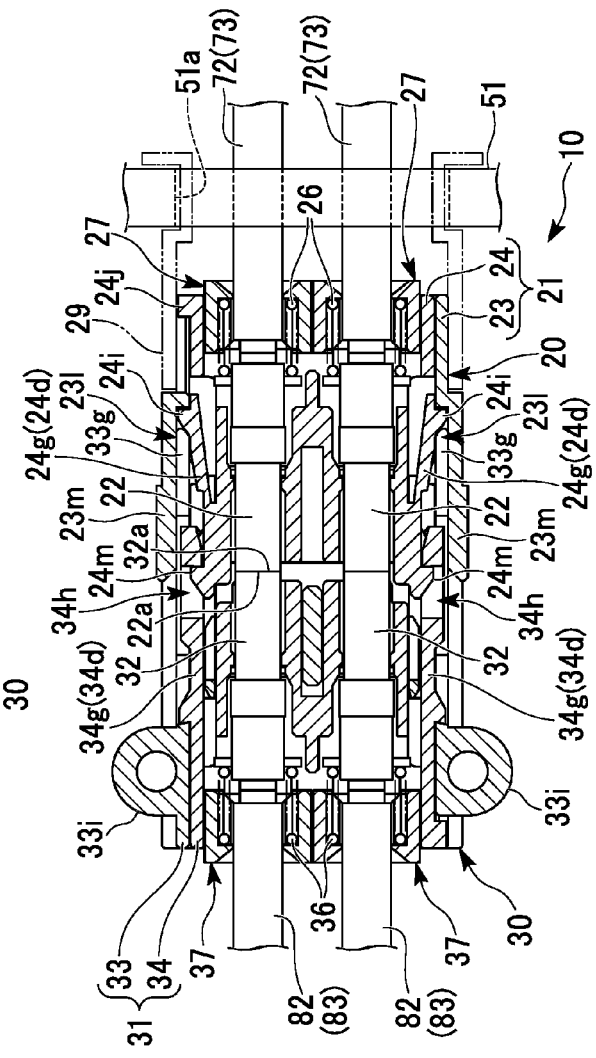
FIG. 9A
FIG. 9B

OPTICAL CONNECTOR

CROSS REFERENCE TO RELATED APPLICATIONS

Priority is claimed on Japanese Patent Application No. 2014-113187, filed on May 30, 2014, the contents of which are incorporated herein by reference.

BACKGROUND OF THE INVENTION

1. Field of the Invention

The present invention relates to an optical connector, and relates to an optical connector including a pair of housings accommodating an optical connector ferrule and detachably fitting each other, thereby, butt-jointing of ferrules is realized.

2. Description of Related Art

As a plug-in optical connector, there is a so-called backplane connector (hereinafter, also referred to as a backplane optical connector). The backplane optical connector has a structure such that a print board housing (hereinafter, also referred to as a PH housing) attached to a print board is fitted with a backplane housing (hereinafter, also referred to as a BH housing) attached to a backplane of a plug-in unit to assemble an optical connector adaptor which connects optical connectors (plugs).

The BH housing generally has a structure accommodating an internal housing into which a connector hole where a connector is fitted is penetrated inside an external housing having a square-tube shape and attached to the backplane (for example, see Japanese Unexamined Patent Application, First Publication No. H05-045541).

As a PH housing, a structure is used such that an insertion piece which is inserted into the BH housing and a claw elastic piece which is engaged with an internal housing of the BH housing are arranged and protruded at a base portion fixed on a print board.

Conventionally, a pair of insertion pieces is arranged with a gap in a direction perpendicular to an insertion and removal direction of the PH housing with respect to the BH housing (i.e., a width direction). In addition, a pair of claw elastic pieces is arranged with a gap in a longitudinal direction perpendicular to the insertion and removal direction and the width direction.

In the BH housing, the internal housing is provided movably with respect to the external housing in an axial direction (corresponding to the insertion and removal direction described above). In addition, at an inner surface of the external housing, a locking portion for locking a locking portion is protruded. Conventionally, a pair of locking portions is arranged with a gap in a direction perpendicular to an axial direction of the external housing (i.e., a width direction). On the other hand, at an internal housing, an elastic locking piece which is locked on a locking portion of the external housing is formed. Conventionally, a pair of elastic locking pieces is arranged with a gap in the width direction similar to the pair of locking portions of the external housing.

In a state where the elastic locking piece of the internal housing is engaged with the locking portion of the external housing, with respect to the external housing, the internal housing is prevented from moving to an insertion direction of the PH housing with respect to the BH housing (the direction corresponds to the axis direction described above).

An insertion piece accommodation hole into which the insertion piece of the PH housing is inserted is secured between the outer housing and the inner housing of the BH housing. The above-mentioned locking portion of the outer housing and the elastic locking piece of the inner housing are disposed in the insertion piece accommodation hole. In the related art, a pair of insertion piece accommodation holes is arranged with an interval therebetween in the horizontal width direction in the same manner as that of the pair of locking portions or the pair of elastic locking pieces.

In addition, an engagement convex portion which is engaged with a claw-attached elastic piece of the PH housing is formed in the inner housing of the BH housing. In the related art, a pair of engagement convex portions is formed on both pieces of the inner housing in the vertical width direction to correspond to a pair of claw-attached elastic pieces. Each of the engagement convex portions is formed to be recessed from the outside of the inner housing in the vertical width direction.

The PH housing is fitted to the BH housing by inserting the insertion piece into the insertion piece accommodation hole which is secured between the outer housing and the inner housing of the BH housing, and engaging the claw-attached elastic pieces which protrude from both sides of the base portion with the engagement convex portions of the inner housing of the BH housing.

In the backplane optical connector, by fitting the PH housing to the BH housing, the optical connector which is fitted into the connector hole that penetrates through the base portion of the PH housing and the optical connector which is fitted into the connector hole of the inner housing of the BH housing can be butt-jointed to each other.

In addition, by inserting the insertion piece of the PH housing into the insertion piece accommodation hole of the BH housing, the elastic locking piece of the inner housing is displaced inwardly and is thus released from a state of being locked to the locking portion of the outer housing. Accordingly, the inner housing can be moved with respect to the outer housing in the axis direction, and thus the optical connector on the PH housing side and the optical connector on the BH housing side are butt-jointed in an appropriate state.

In addition, the PH housing in a state of being fitted to the BH housing is pulled in a direction away from the BH housing so as to release the engagement of the claw-attached elastic piece with the inner housing of the BH housing, thereby being separated from the BH housing.

In the backplane optical connector of the related art, there is a need to secure gaps (the pair of insertion piece accommodation holes) into which the insertion pieces of the PH housing on both sides in the horizontal width direction are inserted, between the outer housing and the inner housing of the BH housing.

Therefore, in the backplane optical connector of the related art, there is a problem in that it is difficult to set the dimensions of the BH housing in the horizontal width direction to be small.

SUMMARY OF THE INVENTION

The present invention has been made taking the foregoing circumstances into consideration, and provides an optical connector which can easily realize a reduction in the size of a housing mounted on a backplane of a plug-in unit.

According to a first aspect of the present invention, an optical connector includes: a first housing; a first ferrule which is embedded in the first housing; a second housing which is detachably fitted to the first housing; and a second ferrule which is embedded in the second housing and is butt-jointed to the first ferrule when the second housing is fitted to the first housing, in which the first housing includes a tubular outer housing, and a tubular inner housing which is accommodated in the outer housing to be movable in a center axis direction of the outer housing and which accommodates the first ferrule, a pair of engagement pieces which are arranged in a vertical width direction perpendicular to the center axis direction of the outer housing are formed in the inner housing, a pair of engaged pieces which are arranged in the vertical width direction and are respectively engaged with the engagement pieces so as to allow the second housing to be fitted to the inner housing are formed in the second housing, a pair of elastic locking pieces which are arranged in the vertical width direction are provided in an outer circumference of the inner housing, a pair of restriction locking portions which are arranged in the vertical width direction and are respectively locked to the pair of elastic locking pieces in a state where the second housing is separated from the first housing so as to restrict movement of the inner housing with respect to the outer housing are formed in the outer housing, and a pair of locking releasing pieces which are arranged in the vertical width direction while extending toward the first housing, and allow the pair of elastic locking pieces to be elastically displaced toward the inside by further moving the second housing toward the first housing side in a state where the pair of engagement pieces are engaged with the pair of engaged pieces so as to release a state where the pair of restriction locking portions and the pair of elastic locking pieces are locked, are formed in the second housing.

According to a second aspect of the present invention, in the optical connector according to the first aspect, a pair of window portions which are arranged in the vertical width direction to expose the inner housing to the outside may be formed in the outer housing, and the engagement piece and the elastic locking piece of the inner housing may be inserted into the window portion.

According to a third aspect of the present invention, in the optical connector according to the first and second aspects, the engagement piece may be disposed closer to a front side of the inner housing in a center axis direction thereof than the elastic locking piece.

According to a fourth aspect of the present invention, in the optical connector according to the first to third aspects, the locking releasing piece may be disposed closer to a front side of the second housing in a center axis direction thereof than the engaged piece.

According to a fifth aspect of the present invention, in the optical connector according to the first to fourth aspects, in one of the first ferrule and the second ferrule, a pair of positioning pins which protrude from an end surface to be buttjointed may be provided, in the other of the first ferrule and the second ferrule, a pair of positioning holes into which the pair of positioning pins are respectively inserted in a state where the first ferrule and the second ferrule are butt-jointed to each other to allow the first ferrule and the second ferrule to be positioned may be provided, and the pair of positioning pins or the pair of positioning holes provided in the first ferrule may be arranged with an interval in a horizontal width direction therebetween perpendicular to the center axis direction and the vertical width direction.

According to a sixth aspect of the present invention, in the optical connector according to the first to fifth aspects, a plurality of inner housings may be accommodated in the outer housing in a state of being arranged in the horizontal width direction which is perpendicular to the center axis direction and the vertical width direction.

According to a seventh aspect of the present invention, in the optical connector according to the first to sixth aspects, the first housing may be mounted on a connector mounting wall, and the second housing is mounted on a printed board which is able to advance toward and retreat from the connector mounting wall.

According to the present invention, unlike the related art, gaps between the inner housing and the outer housing into which the locking releasing pieces are inserted are not arranged in the horizontal width direction perpendicular to the center axis direction and the vertical width direction of the outer housing. Therefore, the dimensions of the first housing in the horizontal width direction can be set to be small. Accordingly, a reduction in the size of the first housing can be easily realized.

BRIEF DESCRIPTION OF THE DRAWINGS

FIG. 3A is a plan view showing the exterior of the receiving side optical connector of the optical connector of FIG. 1.

FIG. 3B is a front view showing the exterior of the receiving side optical connector of the optical connector of FIG. 1.

FIG. 3C is a side view showing the exterior of the receiving side optical connector of the optical connector of FIG. 1.

FIG. 3D is a rear view showing the exterior of the receiving side optical connector of the optical connector of FIG. 1.

FIG. 4A is a plan view showing the exterior of the movable side optical connector of the optical connector of FIG. 1.

FIG. 4B is a rear view showing the exterior of the movable side optical connector of the optical connector of FIG. 1.

FIG. 4C is a side view showing the exterior of the movable side optical connector of the optical connector of FIG. 1.

FIG. 4D is a front view showing the exterior of the movable side optical connector of the optical connector of FIG. 1.

FIG. 9A is a plan view showing the state where the movable side optical connector of the optical connector of FIG. 1 is mounted to the receiving side optical connector.

FIG. 9B is a cross-sectional view taken along line E-E in FIG. 9A.

DETAILED DESCRIPTION OF THE INVENTION

First Embodiment

Hereinafter, a first embodiment of an optical connector according to the present invention will be described with reference to FIGS. 1 to 10.

Figure 1:
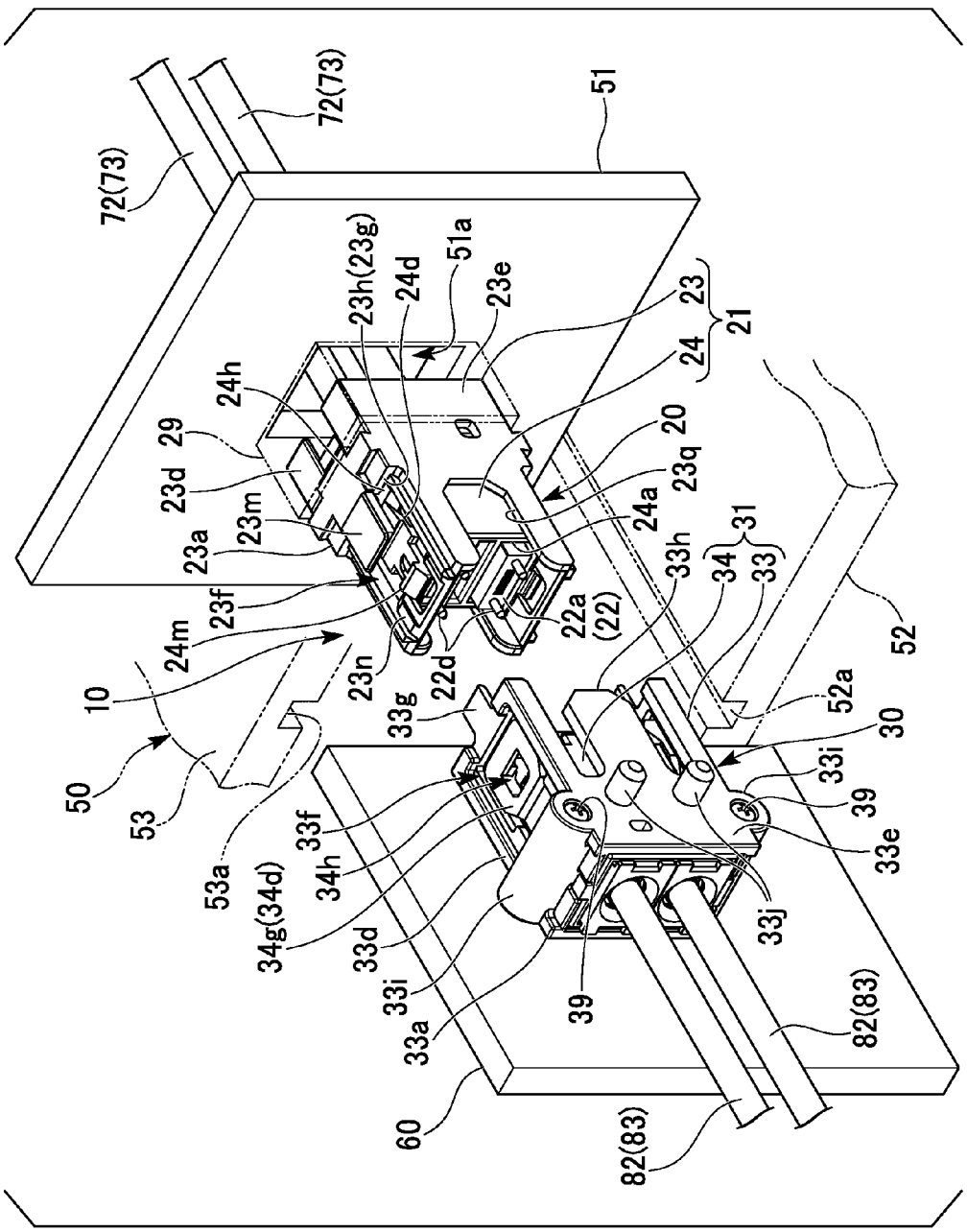
FIG. 1 is a perspective view showing a state where a movable side optical connector is separated from a receiving side optical connector in an optical connector according to a first embodiment of the present invention.
Figure 2:
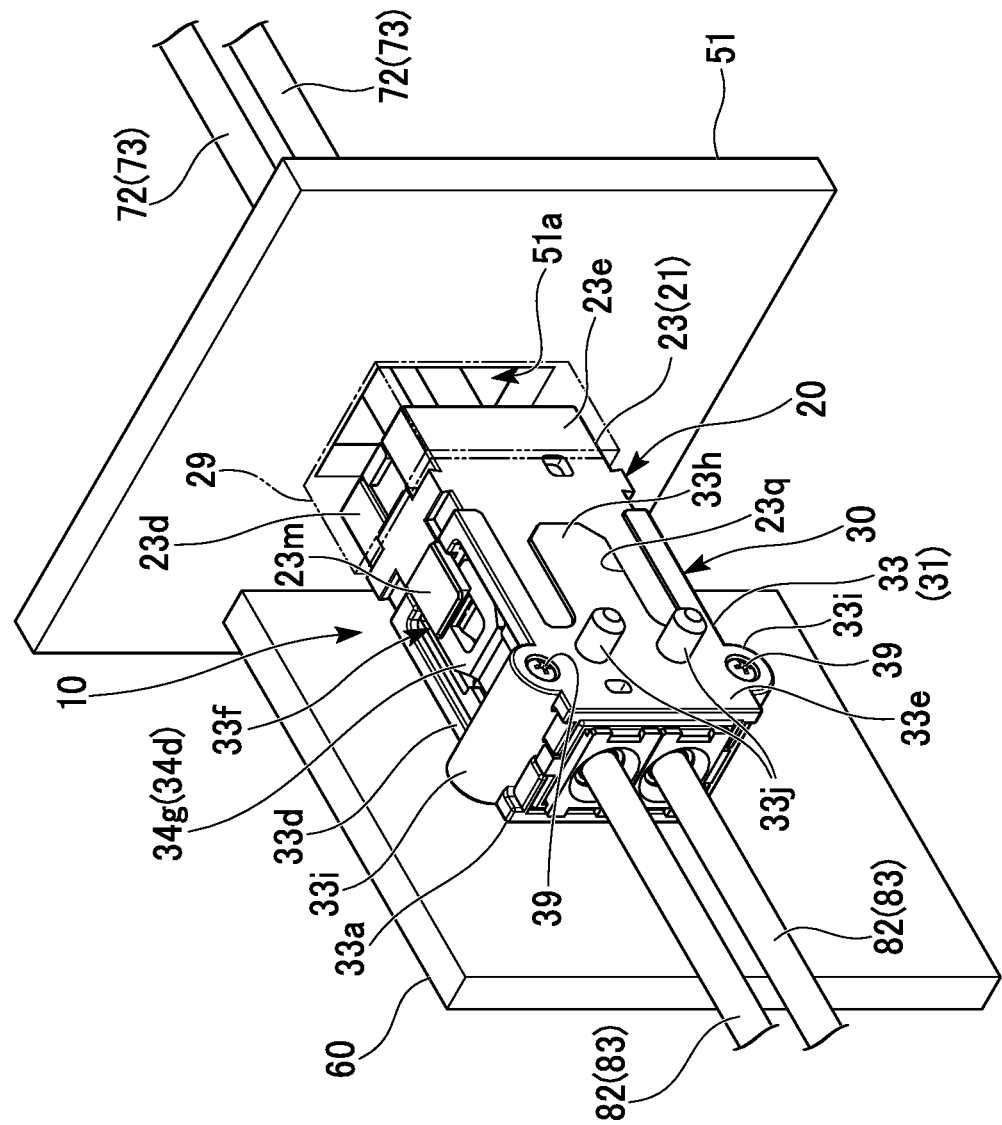
FIG. 2 is a perspective view showing a state where the movable side optical connector is mounted to the receiving side optical connector in the optical connector of FIG. 1.

As shown in FIGS. 1 and 2, an optical connector 10 of this embodiment includes a receiving side optical connector 20 (first optical connector) which is mounted on a connector mounting wall 51 of a plug-in unit 50, and a movable side optical connector 30 (second optical connector) which is mounted on a printed board 60 (printed circuit board) that can be inserted into and separated from the plug-in unit 50.

As shown in FIG. 1, the plug-in unit 50 includes a pair of guide walls 52 and 53 which extend parallel to each other, and the connector mounting wall 51 which is disposed perpendicular to the guide walls 52 and 53. The connector mounting wall 51 functions as a midplane or a backplane.

The receiving side optical connector 20 is mounted so as to protrude from one surface side of the connector mounting wall 51 with a mounting member 29. The portion of the receiving side optical connector 20 which protrudes from one surface side of the connector mounting wall 51 is disposed between the pair of guide walls 52 and 53. In the following description, in some cases, the side of the connector mounting wall 51 from which the receiving side optical connector 20 protrudes is called a front surface side (or front side), and the side opposite to the front surface side thereof is called a rear surface side.

The receiving side optical connector 20 is mounted on the connector mounting wall 51 to correspond to a mounting wall window hole 51a which is formed in the connector mounting wall 51. The mounting wall window hole 51a penetrates through the connector mounting wall 51 in the thickness direction thereof.

In the inner surfaces of the pair of guide walls 52 and 53 which oppose to each other, guide grooves 52a and 53a are respectively formed to guide the advance and the retreat of the printed board 60 with respect to the connector mounting wall 51. While being guided by the guide grooves 52a and 53a of the guide walls 52 and 53, the printed board 60 can advance toward and retreat from the connector mounting wall 51 in a state of being held in a direction perpendicular to the guide walls 52 and 53.

In addition, the guide walls 52 and 53 are shown only in FIG. 1, and the illustration thereof is omitted in the other figures.

Figure 5A:
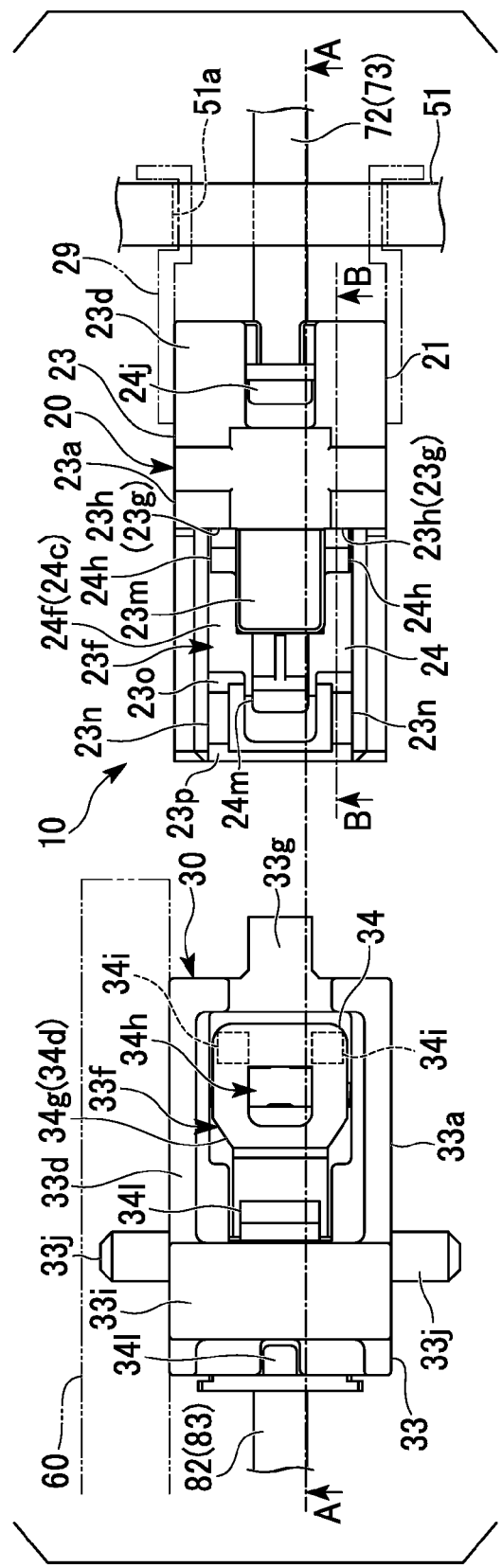
FIG. 5A is a plan view showing a state where the movable side optical connector is separated from the receiving side optical connector in the optical connector of FIG. 1.
Figure 5B:
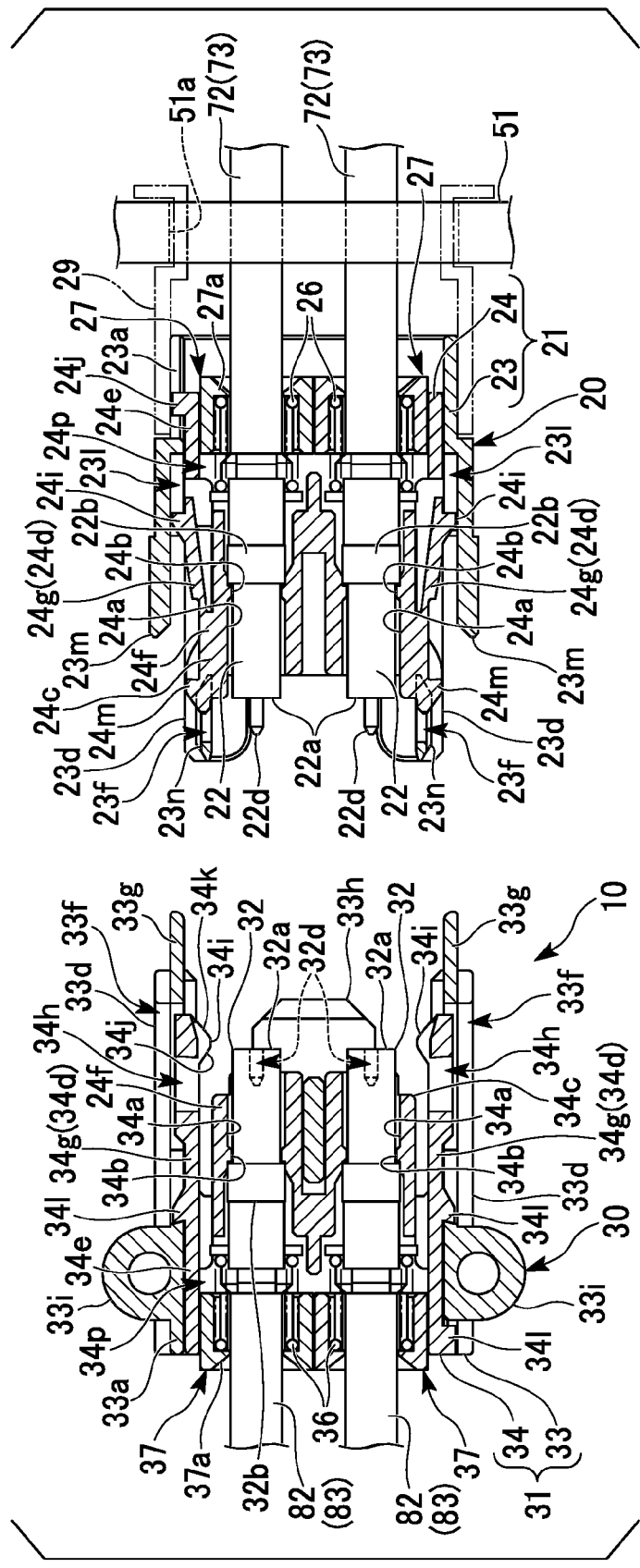
FIG. 5B is a cross-sectional view taken along line A-A in FIG. 5A.

As shown in FIGS. 1, 3B, and 5B, the receiving side optical connector 20 is configured such that a ferrule 22 (hereinafter, referred to as a first ferrule) is embedded in a housing 21 (first housing, hereinafter, referred to as a receiving side housing).

As shown in FIGS. 4D and 5B, the movable side optical connector 30 is configured such that a ferrule 32 (hereinafter, referred to as a second ferrule) is embedded in a housing 31 (second housing, hereinafter, referred to as a movable side housing).

As shown in FIGS. 2, 9A, and 9B, in the optical connector 10, the ferrules 22 and 32 can be butt-jointed each other by fitting the movable side housing 31 to the receiving side housing 21. The movable side housing 31 can be attached to and detached from the receiving side housing 21 by causing the printed board 60 to advance to and retreat from the connector mounting wall 51. The movable side housing 31 is detachably fitted to the receiving side housing 21.

In the optical connector 10, connection and disconnection between the ferrules 22 and 32 can be switched by attaching and detaching the movable side housing 31 to and from the receiving side housing 21.

First, the receiving side housing 21 of the receiving side optical connector 20 will be described.

As shown in FIGS. 1, 3A to 3D, 5A, and 5B, the receiving side housing 21 includes a tubular outer housing 23, and a tubular inner housing 24 which is accommodated in the outer housing 23 to be movable in the center axis direction thereof.

The outer housing 23 in the shown example includes an outer housing body portion 23a having a substantially angular tube shape.

The exterior of the cross-section of the outer housing body portion 23a which is perpendicular to the center axis of the outer housing body portion 23a has a rectangular shape. Hereinafter, in the receiving side optical connector 20, the longitudinal direction of the cross-section perpendicular to the center axis of the outer housing body portion 23a is referred to as a vertical width direction, and the lateral direction of the cross-section is referred to as a horizontal width direction. In addition, in the receiving side optical connector 20, the center axis of the outer housing body portion 23a of the receiving side housing 21 is referred to as both a forward and a rearward direction.

The outer housing body portion 23a includes end plate portions 23d on both sides in the vertical width direction, and side plate portions 23e on both sides in the horizontal width direction (see particularly FIG. 3D). The cross-section of the inside region of the outer housing body portion 23a which is perpendicular to the axis direction of the outer housing body portion 23a is rectangular.

As shown in FIGS. 1, 3B, and 5B, the first ferrule 22 is accommodated in the inner housing 24. The first ferrule 22 in the shown example is specifically a mechanically transferable (MT) ferrule (an MT type optical connector, specifically, an F12 type optical connector specified in JIS C 5981).

The first ferrule 22 is mounted on the tip end of an optical fiber. The configuration of the optical fiber is not particularly limited, and for example, a multi-core optical fiber ribbon may also be employed. However, the optical fiber in this embodiment is a single-core coated optical fiber, or a single-core optical fiber which is called an optical fiber strand. The tip end of the optical fiber is inserted into and fixed to the first ferrule 22. As shown in FIG. 3B, the tip end surface of a bare optical fiber 71a of the optical fiber which is inserted into and fixed to the first ferrule 22 is exposed from a joint end surface 22a of the front end (tip end) of the first ferrule 22.

The tip end portions of a plurality of (for example, 48) optical fibers are inserted into and fixed to the first ferrule 22. As shown in FIG. 5B, portions of the plurality of optical fibers which are inserted into and fixed to the first ferrule 22, which extend rearward from the first ferrule 22, are accommodated in a protection tube 72. The first ferrule 22 is provided at the tip end of an optical fiber unit 73 in which the plurality of optical fibers are accommodated in the protection tube 72.

As shown in FIGS. 1, 3B, 3C, and 5B, in each of the first ferrules 22, a pair of positioning pins 22d which protrude forward from the joint end surface 22a is provided. The pair of positioning pins 22d is arranged with an interval therebetween. The pair of positioning pins 22d are arranged on both sides of a region of the joint end surface 22a from which the tip end surface of the bare optical fiber 71a is exposed (see particularly FIG. 3B). Each of the first ferrules 22 is accommodated in the inner housing 24 so that the arrangement direction of the pair of positioning pins 22d is aligned with the horizontal width direction of the inner housing 24.

As shown in FIGS. 1, 3B, and 5B, a ferrule accommodation hole 24a which accommodates the first ferrule 22 is formed in the inner housing 24 of the receiving side housing 21. The ferrule accommodation hole 24a is formed to extend in the center axis direction of the inner housing 24. A plurality of (in the shown example, two) ferrule accommodation holes 24a which are separated from each other in the vertical width direction of the inner housing 24 are formed. One of the first ferrules 22 is accommodated in one of the plurality of ferrule accommodation holes 24a of the inner housing 24.

The first ferrule 22 accommodated in the ferrule accommodation hole 24a is movable in the forward and rearward directions of the inner housing 24 (coincident with the center axis direction of the ferrule accommodation hole 24a) within a predetermined range.

As shown in FIG. 5B, a separation prevention protrusion 24b protrudes from the inner surface of each of the ferrule accommodation holes 24a. The separation prevention protrusion 24b prevents the first ferrule 22 from separating from the inner housing 24 on the front side thereof. A flange portion 22b which protrudes from the outer circumference of the rear end portion of the first ferrule 22 abuts the separation prevention protrusion 24b from the rear side thereof such that the separation of the first ferrule 22 from the ferrule accommodation hole 24a on the front side of the inner housing 24 is prevented.

When the flange portion 22b of the first ferrule 22 abuts the separation prevention protrusion 24b from the rear side thereof, the front end portion of the first ferrule 22 on the joint end surface 22a side is in a state of protruding toward the front side of the inner housing 24 from the ferrule accommodation hole 24a.

In addition, each of the ferrule accommodation holes 24a of the inner housing 24 communicates with a rear recess 24p which is formed to be recessed from the rear end of the inner housing 24. Each of the ferrule accommodation holes 24a is formed to extend from the rear recess 24p toward the front side thereof. A spring 26 which is disposed on the rear side opposite to the joint end surface 22a of the first ferrule 22 is accommodated in the rear recess 24p. The spring 26 elastically biases the first ferrule 22 toward the front side of the inner housing 24.

The spring 26 in the shown example, which is shown in FIG. 5B, is a coil spring. After the optical fiber unit 73 is inserted, the spring 26 is interposed between a portion of the rear side of the first ferrule 22 and a spring receiving member 27 fixed to the rear end portion of the inner housing 24. The receiving side housing 21 also includes the spring receiving member 27.

The spring receiving member 27 is formed so that the optical fiber unit 73 is able to be inserted therethrough. An annular receiving portion 27a which protrudes toward the inside in the radial direction is formed at the end portion of the rear side of the spring receiving member 27. The spring 26 abuts the receiving portion 27a. In this embodiment, a plurality of (in the shown example, two) spring receiving members 27 corresponding to the number of first ferrules 22 are provided. The plurality of spring receiving members 27 are arranged in the vertical width direction of the inner housing 24 according to the arrangement of the plurality of ferrule accommodation holes 24a.

As shown in FIG. 5B, in a state where the movable side optical connector 30 is separated from the receiving side optical connector 20 and a pushing force in a direction toward the rear side of the receiving side optical connector 20 is not applied to the inner housing 24, the flange portion 22b of the first ferrule 22 comes into pressure contact with the separation prevention protrusion 24b from the rear side thereof via the elastic biasing force of the spring 26.

In the following description, a position of the first ferrule 22 with respect to the inner housing 24 shown in FIG. 5B, that is, a position where the flange portion 22b abuts the separation prevention protrusion 24b from the rear side thereof is also called an initial position. The first ferrule 22 of the receiving side optical connector 20 shown in FIGS. 1, 3B, and 3C is at the initial position with respect to the inner housing 24.

In FIG. 5B and the like, the first ferrule 22 at the initial position can be pushed into the inner housing 24 toward the rear side thereof from the initial position while compressing the spring 26 with the pushing force exerted in a direction toward the rear side of the receiving side optical connector 20 from the front side of the inner housing 24. As the first ferrule 22 is pushed into the inner housing 24 toward the rear side thereof from the initial position, the rear end portion of the first ferrule 22 is pushed out of the rear recess 24p of the inner housing 24 (for example, see FIG. 7B).

In addition, when the pushing force exerted toward the rear side of the inner housing 24 is released, the first ferrule 22 which is pushed into the inner housing 24 so as to be closer to the rear side thereof than the initial position returns to the initial position via the elastic biasing force of the spring 26.

As shown in FIGS. 5A and 5B, the inner housing 24 includes an inner housing main body 24c in which the ferrule accommodation hole 24a is formed, and a pair of elastic locking pieces 24d and a pair of engagement pieces 24m which are provided on the outer circumference of the inner housing main body 24c.

In this embodiment, the plurality of ferrule accommodation holes 24a are formed in the inner housing main body 24c so that the center axes thereof are parallel to each other. In addition, the inner housing 24 is accommodated in the outer housing 23 so that the center axis of the ferrule accommodation hole 24a of the inner housing main body 24c is parallel to the center axis of the outer housing body portion 23a having an angular tube shape.

As shown in FIG. 5B and the like, the inner housing main body 24c has a rectangular exterior in the cross-section corresponding to the inner surface of the outer housing body portion 23a, and includes a housing main portion 24e which extends in the forward and rearward directions coincident with the center axis direction of the ferrule accommodation hole 24a and a front side tubular portion 24f which protrudes toward the front side from the housing main portion 24e. The above-described rear recess 24p is formed in the housing main portion 24e.

The housing main portion 24e is accommodated in the outer housing body portion 23a so that the longitudinal direction of the cross-section of the housing main portion 24e which is perpendicular to the forward and rearward directions is coincident with the vertical width direction of the outer housing 23. Accordingly, the inner housing 24 is movable in the forward and rearward directions with respect to the outer housing 23.

In a state where the housing main portion 24e is accommodated in the outer housing body portion 23a, the plurality of ferrule accommodation holes 24a are arranged in the vertical width direction of the outer housing 23. In addition, the front end of the ferrule accommodation hole 24a is open to the front end of the front side tubular portion 24f (the front end of the inner housing main body 24c). In addition, the ferrule accommodation hole 24a is formed to extend in the forward and rearward directions of the inner housing 24 from the front end of the front side tubular portion 24f of the inner housing main body 24c to the rear recess 24p. The first ferrule 22 disposed at the initial position protrudes from the opening of the ferrule accommodation hole 24a, which is open to the front side of the inner housing main body 24c, to the front side of the inner housing 24.

As shown in FIG. 5B and the like, the pair of elastic locking pieces 24d are arranged in the vertical width direction of the inner housing main body 24c. In the shown example, the pair of elastic locking pieces 24d is provided on both sides of the front side tubular portion 24f of the inner housing main body 24c in the vertical width direction.

Figure 6:
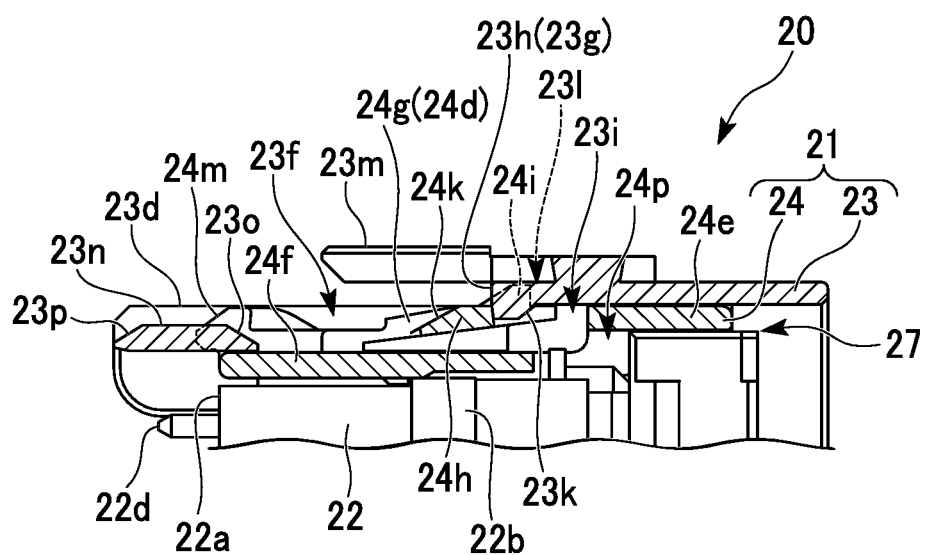
FIG. 6 is a cross-sectional view taken along line B-B in FIG. 5A.

As shown in FIGS. 5A, 5B, 6, and the like, each of the elastic locking pieces 24d includes an elastic extension piece 24g which extends from the end portion of the front side tubular portion 24f in the vertical width direction toward the rear side, and a locking claw 24h which is provided at the tip end portion of the elastic extension piece 24g in the extension direction thereof. The elastic extension piece 24g is elastically deformable with respect to the inner housing main body 24c so that the tip end portion thereof in the extension direction moves in a direction approaching the outer circumference of the front side tubular portion 24f. That is, the elastic locking piece 24d can be elastically displaced toward the inside of the inner housing 24 in the vertical width direction. As shown in FIGS. 3A, 5A, and 6, the locking claw 24h of this embodiment is provided to protrude from the tip end portion of the elastic extension piece 24g toward both sides in the horizontal width direction.

In addition, each of the elastic locking pieces 24d includes a pressed protrusion 24i which is provided at the tip end portion of the elastic extension piece 24g in the extension direction thereof. The pressed protrusion 24i protrudes from the center portion of the elastic extension piece 24g in the horizontal width direction in a direction away from the outer circumference of the front side tubular portion 24f (a direction coincident with the vertical width direction).

As shown in FIG. 5B and the like, the pair of engagement pieces 24m are arranged in the vertical width direction of the inner housing main body 24c similarly to the pair of elastic locking pieces 24d described above. In the shown example, the pair of engagement pieces 24m is provided on both sides of the front side tubular portion 24f of the inner housing main body 24c in the vertical width direction. Each of the engagement pieces 24m is disposed closer to front side of the inner housing main body 24c than the pair of elastic locking pieces 24d. Each of the engagement pieces 24m in the shown example protrudes from the center portion of the front side tubular portion 24f in the horizontal width direction in a direction away from the outer circumference of the front side tubular portion 24f (the direction coincident with the vertical width direction).

Furthermore, as shown in FIGS. 3A, 5A, and 5B, the inner housing 24 includes an advance restriction protrusion 24j which protrudes from the rear end of the inner housing main body 24c in a direction perpendicular to the forward and rearward directions. The advance restriction protrusion 24j is disposed on the rear side of the outer housing 23, specifically, the rear side of the outer housing body portion 23a. The advance restriction protrusion 24j abuts the outer housing 23 from the rear side thereof and thus restricts the forward movement (advance) of the inner housing 24 with respect to the outer housing 23.

As shown in FIGS. 5A, 5B, 6, and the like, in the outer housing 23 of the receiving side housing 21, a pair of window portions 23f which allow the inner housing 24 to be exposed to the outside are formed. The pair of window portions 23f is arranged in the vertical width direction of the outer housing 23. In this embodiment, the pair of window portions 23f is respectively formed in the pair of end plate portions 23d of the outer housing body portion 23a. Each of the window portions 23f is formed to penetrate through the corresponding end plate portion 23d in the thickness direction thereof.

The elastic locking piece 24d and the engagement piece 24m of the inner housing 24 which are described above are inserted into the window portion 23f. In addition, the elastic locking piece 24d and the engagement piece 24m protrude from each of the window portions 23f toward the outside of the outer housing 23. In this embodiment, since the elastic locking piece 24d and the engagement piece 24m are provided in the front side tubular portion 24f of the inner housing main body 24c, each of the window portions 23f is formed in a portion of the outer housing body portion 23a on the front side thereof.

In the outer housing 23 of the receiving side housing 21, a pair of restriction locking portions 23g which are arranged in the vertical width direction of the outer housing 23 are formed.

The pair of restriction locking portion 23g are respectively locked to the pair of elastic locking pieces 24d of the inner housing 24 in a state where the movable side housing 31 is separated from the receiving side housing 21 so as to restrict the rearward movement of the inner housing 24 with respect to the outer housing 23.

In this embodiment, the pair of restriction locking portions 23g is locking surfaces 23h which are respectively formed in the pair of end plate portions 23d of the outer housing body portion 23a and on which the elastic locking pieces 24d of the inner housing 24 abut from the front side of the outer housing 23.

A pair of locking surfaces 23h in the shown example is formed on both sides of each of the end plate portions 23d in the horizontal width direction. A pair of locking claws 24h in the elastic locking piece 24d, which protrude toward both sides of the elastic extension piece 24g in the horizontal width direction, abuts the pair of locking surfaces 23h. In addition, the locking surface 23h in the shown example is a portion of the surface which faces the front side of the outer housing 23 in the inner surface of the above-described window portion 23f (hereinafter, referred to as a front side surface).

The elastic locking piece 24d of the inner housing 24 described above is elastically deformable so that the locking claw 24h thereof is displaced to be closer to the inside of the outer housing 23 in the vertical width direction than the above-described locking surface 23h. In a state where the elastic locking piece 24d is elastically deformed toward the inside, the locking state of the elastic locking piece 24d of the inner housing 24 and the restriction locking portion 23g of the outer housing 23 is released, and the rearward movement of the inner housing 24 with respect to the outer housing 23 is allowed.

In addition, as shown in FIG. 6, accommodation recesses 23i for respectively accommodating the locking claws 24h are formed at positions with an interval therebetween closer to the rear side of the outer housing 23 than the locking surfaces 23h in the inner surface of the outer housing 23. The accommodation recess 23i is a region into which the locking claw 24h is inserted when the locking state of the elastic locking piece 24d of the inner housing 24 and the restriction locking portion 23g of the outer housing 23 is released and then the inner housing 24 is moved toward the rear side of the outer housing 23.

At least one of opposing surfaces 24k and 23k (particularly see FIG. 10) of the locking claw 24h and the accommodation recess 23*i* which oppose each other in the forward and rearward directions of the outer housing 23 in a state where the locking claw 24*h* is inserted into the accommodation recess 23*i* is an inclined guide surface which guides the locking claw 24*h* to be pulled out of the accommodation recess 23*i* when the locking claw 24*h* is pushed against the opposing surface 23*k* of the accommodation recess 23*i*. The inclined guide surface is inclined toward the front side of the outer housing 23 moving closer to the inside of the outer housing 23. In the shown example, both of the opposing surfaces 24*k* and 23*k* of the locking claw 24*h* and the accommodation recess 23*i* function as the above-described inclined guide surfaces.

In addition, as shown in FIGS. 5A and 5B, in a region between the pair of locking surfaces 23*h* described above in the front side surface of the window portion 23*f*, an insertion recess 23*l* which accommodates the pressed protrusion 24*i* of the elastic locking piece 24*d* is open. The insertion recess 23*l* is formed to be recessed from the inner surface of the outer housing 23. The dimensions of the insertion recess 23*l* (particularly, the dimensions of the insertion recess 23*l* in a direction coincident with the forward and rearward directions) are set so that the pressed protrusion 24*i* and a locking releasing piece 33*g* of the movable side housing 31, which will be described later, do not interfere with the outer housing 23 regardless of the attached or detached state of the receiving side housing 21 and the movable side housing 31 (see FIGS. 9A and 9B). In the shown example, a region corresponding to the above-described insertion recess 23*l* of the outer surface of the outer housing 23 protrudes outward in the vertical width direction.

As shown in FIGS. 5A and 5B, a protection wall portion 23*m* which covers the window portion 23*f* from the outside and protects a portion of the elastic locking piece 24*d* which is inserted into the window portion 23*f* is formed in the outer housing 23. The protection wall portion 23*m* protrudes toward the front side of the outer housing 23 in a region closer to the outside of the outer housing 23 than the open region of the insertion recess 23*l* of the front side surface of the window portion 23*f*. The protection wall portion 23*m* in the shown example covers the elastic extension piece 24*g* of the elastic locking piece 24*d*, but does not cover the locking claw 24*h* of the elastic locking piece 24*d* or the engagement piece 24*m*. In addition, the protection wall portion 23*m* is disposed to form a gap from the base end portion of the elastic extension piece 24*g* in the extension direction thereof.

Furthermore, as shown in FIGS. 5A, 5B, 6, and the like, a pair of riding protrusions 23*n* are provided in the outer housing 23. The pair of riding protrusions 23*n* is arranged in the vertical width direction of the outer housing 23. Each of the riding protrusions 23*n* is formed at the front end portion of the outer housing 23. Each of the riding protrusions 23*n* protrudes outward (in a direction coincident with the vertical width direction) from the outer surface of the end plate portion 23*d* of the outer housing 23.

In the end portion of the riding protrusions 23*n* on the rear side of the outer housing 23, an engagement releasing guide surface 23*o* which is inclined toward the front side of the outer housing 23 moving closer to the outside of the outer housing 23 (a direction in which the riding protrusion 23*n* protrudes) is formed. In addition, in the end portion of the riding protrusions 23*n* on the front side of the outer housing 23, an engagement guide surface 23*p* which is inclined toward the rear side of the outer housing 23 moving closer to the outside of the outer housing 23 and is formed.

In this embodiment, the riding protrusions 23*n* are respectively formed on both sides of the engagement piece 24*m*, which is inserted into the window portion 23*f* of the outer housing 23, in the horizontal width direction of the outer housing 23.

In addition, as shown in FIGS. 1 to 3, a pair of insertion cutouts 23*q* into which insertion protrusions 33*h* of the movable side housing 31, which will be described later, is inserted when the movable side housing 31 is fitted to the receiving side housing 21 is formed in the outer housing 23. The pair of insertion cutouts 23*q* is arranged in the horizontal width direction of the outer housing 23. Each of the insertion cutouts 23*q* is recessed from the front end of the outer housing 23 toward the rear side. Each of the insertion cutouts 23*q* is formed in the side plate portion 23*e* of the outer housing body portion 23*a*.

In the receiving side housing 21 of this embodiment configured as described above, as shown in FIGS. 1, 3A to 3D, 5A, 5B, and 6, in a state where the elastic locking piece 24*d* of the inner housing 24 is locked to the restriction locking portion 23*g* of the outer housing 23, that is, in a state where the locking claw 24*h* of the elastic locking piece 24*d* opposes the locking surface 23*h* of the outer housing 23, the rearward movement of the inner housing 24 with respect to the outer housing 23 is restricted. In addition, due to the advance restriction protrusion 24*j* disposed on the rear side of the outer housing 23, the forward movement of the inner housing 24 with respect to the outer housing 23 is restricted.

Therefore, in the state where the elastic locking piece 24*d* of the inner housing 24 is locked to the restriction locking portion 23*g* of the outer housing 23, the movement of the inner housing 24 in the forward and the rearward directions with respect to the outer housing 23 is restricted and thus the inner housing 24 does not come away from the outer housing 23.

In addition, the above-described receiving side optical connector 20 is mounted on the connector mounting wall 51 with the mounting member 29. The configuration, shape, and the like of the mounting member 29 may be arbitrary. The mounting member 29 may be held in a state where the outer housing 23 is locked to the mounting wall window hole 51*a* of the connector mounting wall 51 so that slight play of the outer housing 23 with respect to at least the connector mounting wall 51 is allowed.

In the shown example, the mounting member 29 is interposed between the outer housing 23 and the connector mounting wall 51. In addition, the mounting member 29 is formed in an angular tube shape which is slightly larger than the outer housing body portion 23*a*. The rear end portion of the outer housing body portion 23*a* is held in a state of being inserted into the front end portion of the mounting member 29. The rear end portion of the mounting member 29 is locked to the mounting wall window hole 51*a* of the connector mounting wall 51.

Next, the movable side housing 31 of the movable side optical connector 30 will be described.

As shown in FIGS. 1, 4A to 4D, 5A, and 5B, the movable side housing 31 includes a tubular outer housing 33 (hereinafter, also referred to as a movable side outer housing), and an inner housing 34 (hereinafter, also referred to as a movable side inner housing) which is accommodated in the outer housing 33. The outer housing 33 and the inner housing 34 are fixed to each other.

The movable side outer housing 33 in the shown example includes an outer housing body portion 33*a* having a substantially angular tube shape.

The exterior of the cross-section of the outer housing body portion 33*a* which is perpendicular to the center axis of the outer housing body portion 33*a* has a rectangular shape.

Hereinafter, in the movable side optical connector 30, the longitudinal direction of the cross-section perpendicular to the center axis of the outer housing body portion 33a is referred to as a vertical width direction, and the lateral direction of the cross-section is referred to as a horizontal width direction. In addition, in the movable side optical connector 30, the center axis of the outer housing body portion 33a of the movable side outer housing 33 is referred to as both a forward and a rearward direction.

The outer housing body portion 33a of the movable side outer housing 33 includes end plate portions 33d on both sides in the vertical width direction, and side plate portions 33e on both sides in the horizontal width direction (see FIG. 4D). The cross-section of the inside region of the outer housing body portion 33a which is perpendicular to the axis direction of the outer housing body portion 33a is rectangular.

As shown in FIGS. 4D and 5B, the second ferrule 32 is accommodated in the movable side inner housing 34. The second ferrule 32 in the shown example is specifically a mechanically transferable (MT) ferrule (an MT type optical connector, specifically, an F12 type optical connector specified in JIS C 5981).

The second ferrule 32 is mounted on the tip end of an optical fiber. The optical fiber in this embodiment is a single-core coated optical fiber, or a single-core optical fiber which is called an optical fiber strand, and also may be a multi-core optical fiber ribbon and the like. The tip end of the optical fiber is inserted into and fixed to the second ferrule 32. As shown in FIG. 4D, the tip end surface of a bare optical fiber 81a of the optical fiber which is inserted into and fixed to the second ferrule 32 is exposed from a joint end surface 32a of the front end (the tip end) of the second ferrule 32.

In the tip end portions a plurality of (for example, 48) optical fibers are inserted into and fixed to the second ferrule 32. As shown in FIG. 5B, portions of the plurality of optical fibers which are inserted into and fixed to the second ferrule 32, which extend rearward from the second ferrule 32, are accommodated in a protection tube 82. The second ferrule 32 is provided at the tip end of an optical fiber unit 83 in which the plurality of optical fibers are accommodated in the protection tube 82.

As shown in FIGS. 4D and 5B, in each of the second ferrules 32, a pair of positioning holes 32d which are recessed from the joint end surface 32a toward the rear side is provided. The pair of positioning holes 32d is arranged with an interval therebetween. The pair of positioning holes 32d is arranged on both sides of a region of the joint end surface 32a from which the tip end surface of the bare optical fiber 81a is exposed. Each of the second ferrules 32 is accommodated in the movable side inner housing 34 so that the arrangement direction of the pair of positioning holes 32d is aligned with the horizontal width direction of the movable side inner housing 34.

Figure 7A:
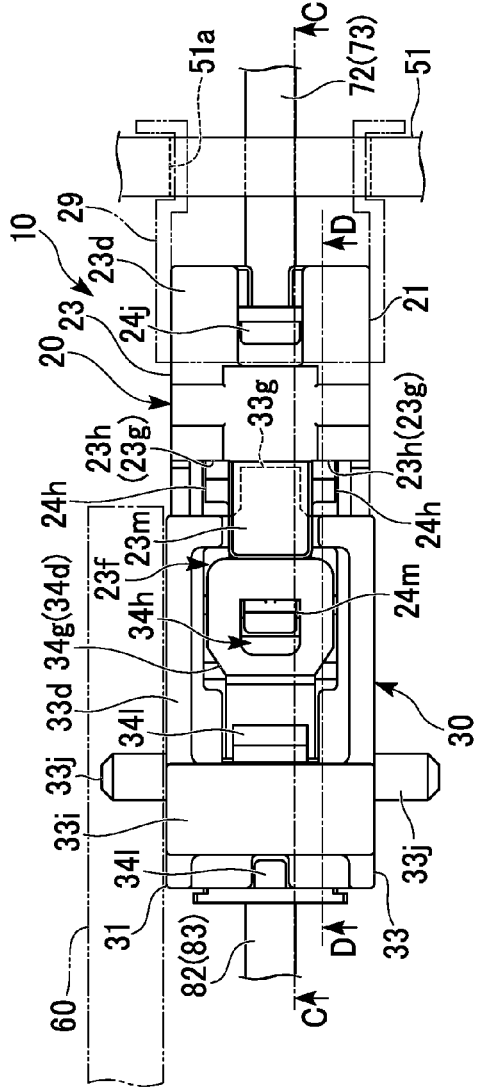
FIG. 7A is a plan view showing an intermediate stage in mounting the movable side optical connector of the optical connector of FIG. 1 to the receiving side optical connector.
Figure 7B:
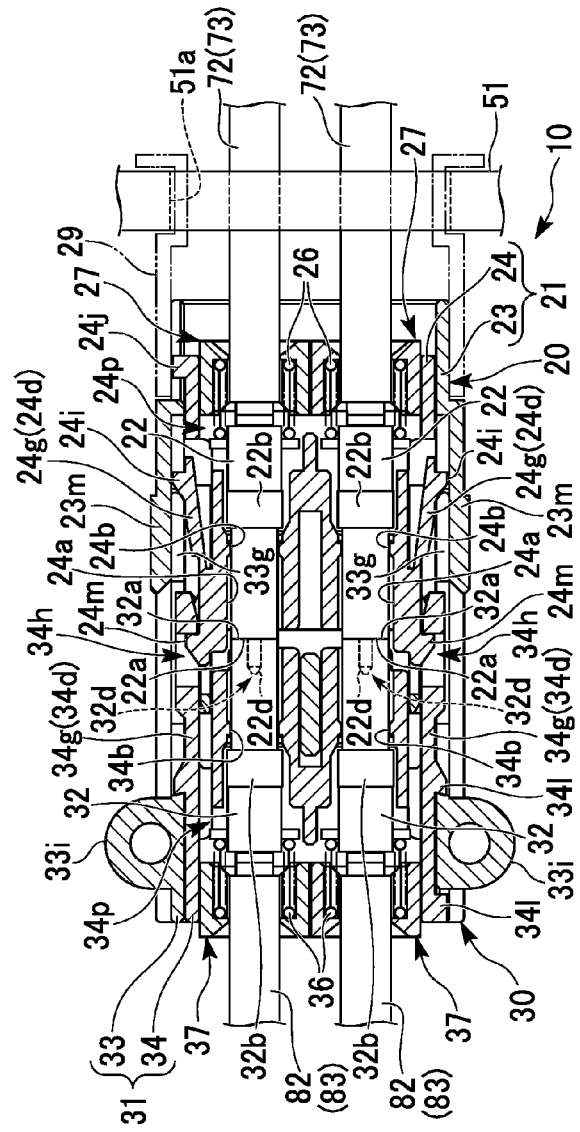
FIG. 7B is a cross-sectional view taken along line C-C in FIG. 7A.

The pair of positioning pins 22d of the first ferrule 22 is respectively inserted into the pair of positioning holes 32d when the first ferrule 22 and the second ferrules 32 are butt-jointed to each other (see FIGS. 7A and 7B). Accordingly, the first ferrule 22 and the second ferrules 32 are positioned together.

In addition, the inside diameter of the positioning hole 32d is set to be equal to the outside diameter of the positioning pin 22d. Furthermore, the interval between the pair of positioning holes 32d is set to be equal to the interval between the pair of positioning pins 22d. Accordingly, the first ferrule 22 and the second ferrules 32 can be butt-jointed to each other with high accuracy by respectively inserting the pair of positioning pins 22d into the positioning hole 32d.

As shown in FIGS. 4D and 5B, a ferrule accommodation hole 34a which accommodates the second ferrule 32 is formed in the movable side inner housing 34. The ferrule accommodation hole 34a is formed to extend in the center axis direction of the movable side inner housing 34. A plurality of (in the shown example, two) ferrule accommodation holes 34a which are separated from each other in the vertical width direction of the movable side inner housing 34 are formed. One of the second ferrules 32 is accommodated in one of the plurality of ferrule accommodation holes 34a of the movable side inner housing 34.

The second ferrule 32 accommodated in the ferrule accommodation hole 34a is movable in the forward and rearward directions of the movable side inner housing 34 (coincident with the center axis direction of the ferrule accommodation hole 34a) within a predetermined range.

A separation prevention protrusion 34b protrudes from the inner surface of each of the ferrule accommodation holes 34a. The separation prevention protrusion 34b prevents the second ferrule 32 from separating from the movable side inner housing 34 on the front side thereof. A flange portion 32b which protrudes from the outer circumference of the rear end portion of the second ferrule 32 abuts the separation prevention protrusion 34b from the rear side thereof such that the separation of the second ferrule 32 from the ferrule accommodation hole 34a on the front side of the movable side inner housing 34 is prevented.

When the flange portion 32b of the second ferrule 32 abuts the separation prevention protrusion 34b from the rear side thereof, the front end portion of the second ferrule 32 on the joint end surface 32a side is in a state of protruding toward the front side of the movable side inner housing 34 from the ferrule accommodation hole 34a.

In addition, as shown in FIG. 5B, each of the ferrule accommodation holes 34a of the movable side inner housing 34 communicates with a rear recess 34p which is formed to be recessed from the rear end of the movable side inner housing 34. Each of the ferrule accommodation holes 34a is formed to extend from the rear recess 34p toward the front side thereof. A spring 36 which is disposed on the rear side opposite to the joint end surface 32a of the second ferrule 32 is accommodated in the rear recess 34p. The spring 36 elastically biases the second ferrule 32 toward the front side of the movable side inner housing 34.

The spring 36 in the shown example, which is shown in FIG. 5B, is a coil spring. After the optical fiber unit 83 is inserted, the spring 36 is interposed between a portion of the rear side of the second ferrule 32 and a spring receiving member 37 fixed to the rear end portion of the movable side inner housing 34. The movable side housing 31 also includes the spring receiving member 37.

The spring receiving member 37 is formed so that the optical fiber unit 83 is able to be inserted therethrough. An annular receiving portion 37a which protrudes toward the inside in the radial direction is formed at the end portion of the rear side of the spring receiving member 37. The spring 36 abuts on the receiving portion 37a. In this embodiment, a plurality of (in the shown example, two) spring receiving members 37 corresponding to the number of second ferrules 32 are provided. The plurality of spring receiving members 37 are arranged in the vertical width direction of the movable side inner housing 34 according to the arrangement of the plurality of ferrule accommodation holes 34a.

As shown in FIG. 5B, in a state where the movable side optical connector 30 is separated from the receiving side optical connector 20 and a pushing force in a direction toward the rear side of the movable side optical connector 30 is not applied to the movable side inner housing 34, the flange portion 32b of the second ferrule 32 comes into pressure contact with the separation prevention protrusion 34b from the rear side thereof via the elastic biasing force of the spring 36.

In the following description, a position of the second ferrule 32 with respect to the movable side inner housing 34 shown in FIG. 5B, that is, a position where the flange portion 32b abuts the separation prevention protrusion 34b from the rear side thereof is also called an initial position. The second ferrule 32 of the movable side optical connector 30 shown in FIGS. 4A to 4D is at the initial position with respect to the movable side inner housing 34.

In FIG. 5B and the like, the second ferrule 32 at the initial position can be pushed into the movable side inner housing 34 toward the rear side thereof from the initial position while compressing the spring 36 with the pushing force exerted in a direction toward the rear side of the movable side optical connector 30 from the front side of the movable side inner housing 34. As the second ferrule 32 is pushed into the movable side inner housing 34 toward the rear side thereof from the initial position, the rear end portion of the second ferrule 32 is pushed out of the rear recess 34p of the movable side inner housing 34 (for example, see FIG. 7B).

In addition, when the pushing force exerted toward the rear side of the movable side inner housing 34 is released, the second ferrule 32 which is pushed into the movable side inner housing 34 so as to be closer to the rear side thereof than the initial position returns to the initial position due to the elastic biasing force of the spring 36.

As shown in FIGS. 4A to 4D, 5A, and 5B, the movable side inner housing 34 includes an inner housing main body 34c (hereinafter, also referred to as a movable side inner housing main body) in which the ferrule accommodation hole 34a is formed, and a pair of engaged pieces 34d which are provided in the outer circumference of the inner housing main body 34c.

In this embodiment, the plurality of ferrule accommodation holes 34a is formed in the movable side inner housing main body 34c so that the center axes thereof are parallel to each other. In addition, the movable side inner housing 34 is accommodated in the movable side inner outer housing 33 so that the center axis of the ferrule accommodation hole 34a of the movable side inner housing main body 34c is parallel to the center axis of the outer housing body portion 33a having an angular tube shape.

As shown in FIG. 5B and the like, the movable side inner housing main body 34c has a rectangular exterior in the cross-section corresponding to the inner surface of the outer housing body portion 33a, and includes a housing main portion 34e which extends in the forward and rearward directions coincident with the center axis direction of the ferrule accommodation hole 34a and a front side tubular portion 34f which protrudes toward the front side from the housing main portion 34e. The above-described rear recess 34p is formed in the housing main portion 34e.

The housing main portion 34e is accommodated in the outer housing body portion 33a so that the longitudinal direction of the cross-section of the housing main portion 34e which is perpendicular to the forward and rearward directions is coincident with the vertical width direction of the movable side outer housing 33.

The dimensions of the front side tubular portion 34f in the vertical width direction are set to be smaller than those of the housing main portion 34e. The outer surface of the front side tubular portion 34f directed in the vertical width direction is positioned closer to the inside than the outer surface of the housing main portion 34e directed in the vertical width direction.

In a state where the housing main portion 34e is accommodated in the outer housing body portion 33a, the plurality of ferrule accommodation holes 34a are arranged in the vertical width direction of the movable side outer housing 33. In addition, the front end of the ferrule accommodation hole 34a is open to the front end of the front side tubular portion 34f (the front end of the movable side inner housing main body 34c). In addition, the ferrule accommodation hole 34a is formed to extend in the forward and rearward directions of the movable side inner housing 34 from the front end of the front side tubular portion 34f of the movable side inner housing main body 34c to the rear recess 34p. The second ferrule 32 disposed at the initial position protrudes from the opening of the ferrule accommodation hole 34a, which is open to the front side of the movable side inner housing main body 34c, to the front side of the movable side inner housing 34.

As shown in FIG. 5B and the like, the pair of engaged pieces 34d are arranged in the vertical width direction of the movable side inner housing main body 34c. The movable side housing 31 is fitted to the inner housing 24 by respectively engaging the pair of engaged pieces 34d with the pair of engagement pieces 24m provided in the inner housing 24 of the receiving side housing 21 described above (for example, see 7A and 7B). In the shown example, the pair of engaged pieces 34d are arranged on both sides of the front side tubular portion 34f of the movable side inner housing main body 34c in the vertical width direction.

Each of the engaged pieces 34d includes an elastic extension piece 34g which extends from the end portion of the front side of the housing main portion 34e toward the front side, and an engagement hole 34h which is formed at the tip end portion of the elastic extension piece 34g in the extension direction.

The elastic extension piece 34g is disposed at an interval from the outer circumference of the front side tubular portion 34f thereof. The elastic extension piece 34g is elastically deformable with respect to the movable side inner housing main body 34c so that the tip end portion thereof in the extension direction moves in a direction approaching the outer circumference of the front side tubular portion 34f and in a direction away from the outer circumference.

The engagement piece 24m of the receiving side housing 21 is inserted into the engagement hole 34h. Accordingly, the engaged piece 34d of the movable side housing 31 is engaged with the engagement piece 24m of the receiving side housing 21. In this embodiment, the engagement piece 24m of the receiving side housing 21 is inserted into the engagement hole 34h from the inside of the movable side inner housing. Therefore, the engagement hole 34h may be formed so as to be recessed from at least the surface of the elastic extension piece 34g which opposes the front side tubular portion 34f. The engagement hole 34h in the shown example is formed to penetrate through the elastic extension piece 34g.

In addition, each of the engaged pieces 34d includes an elastic deformation protrusion 34i for causing the elastic extension piece 34g to be elastically deformed when the engaged piece 34d is engaged with the engagement piece 24m and when the engagement between the engagement piece 24m and the engaged piece 34d is released. The elastic deformation protrusion 34i protrudes from the surface of the elastic extension piece 34g on the front side tubular portion 34f side. The elastic deformation protrusion 34i is disposed closer to the tip end side of the elastic extension piece 34g in the extension direction than the engagement hole 34h.

In the end portion of the elastic deformation protrusion 34*i* on the rear side of the movable side inner housing 34, an engagement releasing guide surface 34*j* which is inclined toward the front side of the movable side inner housing 34 moving closer to the inside of the movable side inner housing 34 (a direction in which the elastic deformation protrusion 34*i* protrudes) is formed. In addition, in the end portion of the elastic deformation protrusion 34*i* on the front side of the movable side inner housing 34, an engagement guide surface 34*k* which is inclined toward the front side of the movable side inner housing 34 moving closer to the inside of the movable side inner housing 34 is formed.

As shown in FIGS. 4A, 4B, and 5A, the elastic deformation protrusions 34*i* of this embodiment are formed on both sides of the movable side inner housing 34 in the horizontal width direction with respect to the engagement hole 34*h*.

As shown in FIGS. 5A, 5B, 6, and 8, for example, when the movable side housing 31 is caused to advance toward the receiving side housing 21 in order to fit the movable side housing 31 to the receiving side housing 21, the elastic deformation protrusion 34*i* rides on the riding protrusion 23*n* of the receiving side housing 21, and thus the elastic extension piece 34*g* is elastically deformed so that the tip end portion of the elastic extension piece 34*g* in the extension direction thereof is moved in a direction away from the outer circumference of the front side tubular portion 34*f*.

In addition, as shown in FIGS. 5A and 5B, the movable side inner housing 34 of this embodiment includes a pair of restriction protrusions 34*l* which restrict the movement of the movable side inner housing 34 in the forward and rearward directions with respect to the movable side outer housing 33. The pair of restriction protrusions 34*l* protrudes from the rear end portion of the movable side inner housing main body 34*c* in a direction perpendicular to the forward and rearward directions. The pair of restriction protrusions 34*l* is arranged with an interval therebetween in the forward and rearward directions of the movable side inner housing 34. The pair of restriction protrusions 34*l* in the shown example is formed in the housing main portion 34*e* of the movable side inner housing main body 34*c*.

The movable side inner housing 34 is fitted to the movable side outer housing 33 by holding a portion of the movable side outer housing 33 between the pair of restriction protrusions 34*l* described above. Accordingly, the movable side inner housing 34 is fixed to the movable side outer housing 33.

A pair of window portions 33*f* (hereinafter, referred to as movable side window portions 33*f*) which allow the movable side inner housing 34 to be exposed to the outside are formed in the movable side outer housing 33. The pair of movable side window portions 33*f* is arranged in the vertical width direction of the movable side outer housing 33. In this embodiment, the pair of movable side window portions 33*f* is respectively formed in the pair of end plate portions 33*d* of the outer housing body portion 33*a*. Each of the movable side window portions 33*f* is formed to penetrate through the corresponding end plate portion 33*d* in the thickness direction thereof.

The engaged piece 34*d* of the movable side inner housing 34 described above is inserted into each of the movable side window portions 33*f*. Here, the elastic deformation protrusion 34*i* of the engaged piece 34*d* protrudes toward the inside of the movable side outer housing 33 from the movable side window portion 33*f*. In this embodiment, since the engaged piece 34*d* is disposed on the outside of the front side tubular portion 34*f* of the movable side inner housing main body 34*c*, each of the movable side window portions 33*f* is formed in a portion of the outer housing body portion 33*a* on the front side thereof.

The movable side outer housing 33 includes a pair of locking releasing pieces 33*g* which are arranged in the vertical width direction of the movable side outer housing 33. Each of the locking releasing pieces 33*g* protrude from the front end of the outer housing body portion 33*a* toward the front side to be directed to the receiving side housing 21. The pair of locking releasing pieces 33*g* respectively protrudes from the front ends of the pair of end plate portions 33*d* of the outer housing body portion 33*a*.

Each of the locking releasing pieces 33*g* is disposed closer to the front side of the movable side outer housing 33 than the above-described movable side window portion 33*f*. That is, each of the locking releasing pieces 33*g* is disposed closer to the front side of the movable side outer housing 33 than the engaged piece 34*d* inserted into the movable side window portion 33*f*.

Figure 10:
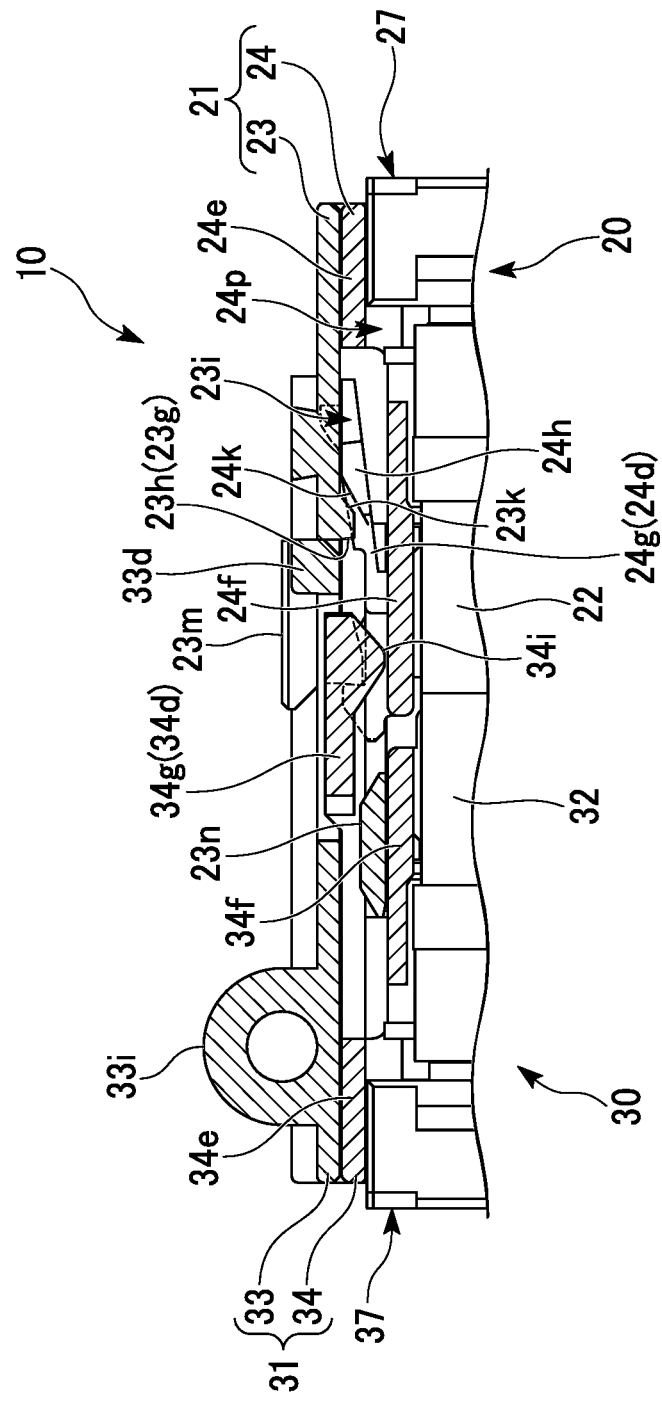
FIG. 10 is a cross-sectional view taken along line F-F in FIG. 9A.

In a state where the pair of engagement pieces 24*m* of the receiving side housing 21 are engaged with the pair of engaged pieces 34*d* of the movable side housing 31 as shown in FIGS. 7A and 7B, by further moving the movable side housing 31 toward the receiving side housing 21 side as shown in FIGS. 9A to 10, the pair of locking releasing pieces 33*g* cause the pair of elastic locking pieces 24*d* of the receiving side housing 21 to be elastically displaced toward the inside such that the locking state of the pair of elastic locking pieces 24*d* and the pair of restriction locking portions 23*g* is released. When the locking state of the pair of elastic locking pieces 24*d* and the pair of restriction locking portions 23*g* is released, the pair of locking releasing pieces 33*g* is pressed against the pressed protrusions 24*i* of the pair of elastic locking pieces 24*d*.

In addition, as shown in FIGS. 1, 2, and 4A to 4D, the movable side outer housing 33 includes a pair of insertion protrusions 33*h* which are respectively inserted into the pair of insertion cutouts 23*q* of the receiving side housing 21 when the movable side housing 31 is fitted to the receiving side housing 21. The pair of insertion protrusions 33*h* is arranged in the horizontal width direction of the movable side outer housing 33. Each of the insertion protrusions 33*h* is formed in the side plate portion 33*e* of the outer housing body portion 33*a*. Each of the insertion protrusions 33*h* protrudes forward from a portion of the outer housing body portion 33*a* on the rear end side. The dimensions of each of the insertion protrusions 33*h* viewed from the side (the horizontal width direction) correspond to the dimensions of each of the insertion cutouts 23*q*. Therefore, in a state where the pair of insertion protrusions 33*h* is respectively inserted into the pair of insertion cutouts 23*q*, a positional deviation between the outer housing 23 of the receiving side housing 21 and the movable side outer housing 33 in the vertical width direction can be suppressed.

A pair of cutouts which are recessed from the front end of the outer housing body portion 33*a* toward the rear side is formed on both end sides of the side plate portion 33*e* in the vertical width direction, and the insertion protrusion 33*h* of this embodiment is formed between the pair of cutouts.

As shown in FIGS. 1, 2, and 5A, the movable side optical connector 30 is mounted on the printed board 60 so that the horizontal width direction of the movable side outer housing 33 is perpendicular to the thickness direction of the printed board 60, that is, the pair of side plate portions 33*e* of the outer housing body portion 33*a* are parallel to the printed board 60 and one of the pair of side plate portions 33*e* opposes the printed board 60. The movable side optical connector 30 is mounted on the printed board 60 with a mounting member. The configuration, shape, and the like of the mounting member may be arbitrary, and the mounting member in this embodiment is a screw 39.

Therefore, as shown in FIGS. 1, 2, 4A to 4D, 5A, and 5B, the movable side outer housing 33 of this embodiment includes a tubular screw insertion portion 33i into which the shaft portion of the screw 39 is inserted. The screw insertion portions 33i are provided integrally with the outer surfaces of the pair of end plate portions 33d of the outer housing body portion 33a so that the axis direction of the screw insertion portion 33i is coincident with the horizontal width direction of the movable side outer housing 33. The screw insertion portion 33i in the shown example is disposed in a portion of the outer housing body portion 33a on the rear side.

In addition, the movable side outer housing 33 of this embodiment includes a positioning protrusion 33j for positioning the movable side optical connector 30 with respect to the printed board 60 before the movable side optical connector 30 is fixed to the printed board 60 with the screw 39. The positioning protrusions 33j are formed integrally with the pair of side plate portions 33e of the outer housing body portion 33a and respectively protrude from the outer surfaces of the pair of side plate portions 33e. A plurality (in the shown example, two) of positioning protrusions 33j are provided in each of the side plate portions 33e.

Accordingly, when the movable side optical connector 30 is mounted on the printed board 60, the positioning protrusion 33j is inserted into a hole (not shown) formed in the printed board 60 in advance to hold the position of the movable side outer housing 33 with respect to the printed board 60, and thus the movable side optical connector 30 can be easily fixed to the printed board 60 with the screw 39.

Next, in the above-described optical connector 10 of this embodiment, an action of mounting the movable side optical connector 30 to the receiving side optical connector 20 will be described.

First, as shown in FIGS. 5A, 5B, and 6, the receiving side optical connector 20 and the movable side optical connector 30 in a state the movable side optical connector 30 is separated from the receiving side optical connector 20 will be described.

In this state, in the receiving side housing 21 which is separated from the movable side housing 31, the pair of elastic locking pieces 24d are locked to the pair of restriction locking portions 23g, and thus the rearward movement of the inner housing 24 (hereinafter, also referred to as a receiving side inner housing) with respect to the outer housing 23 (hereinafter, also referred to as a receiving side outer housing) of the receiving side housing 21 is restricted. In addition, the advance restriction protrusion 24j of the receiving side inner housing 24 is disposed on the rear side of the receiving side outer housing 23, and thus the forward movement of the receiving side inner housing 24 with respect to the receiving side outer housing 23 is restricted. That is, in the receiving side housing 21 in the separated state, the movement of the receiving side inner housing 24 in the forward and rearward directions with respect to the receiving side outer housing 23 is restricted.

In addition, in the receiving side optical connector 20 which is separated from the movable side optical connector 30, the flange portion 22b of the first ferrule 22 abuts the separation prevention protrusion 24b of the receiving side inner housing 24 from the rear side thereof. That is, the first ferrule 22 is disposed at the initial position.

Furthermore, in the movable side optical connector 30 which is separated from the receiving side optical connector 20, the flange portion 32b of the second ferrule 32 abuts the separation prevention protrusion 34b of the movable side inner housing 34 from the rear side thereof. That is, the second ferrule 32 is disposed at the initial position.

Figure 8:
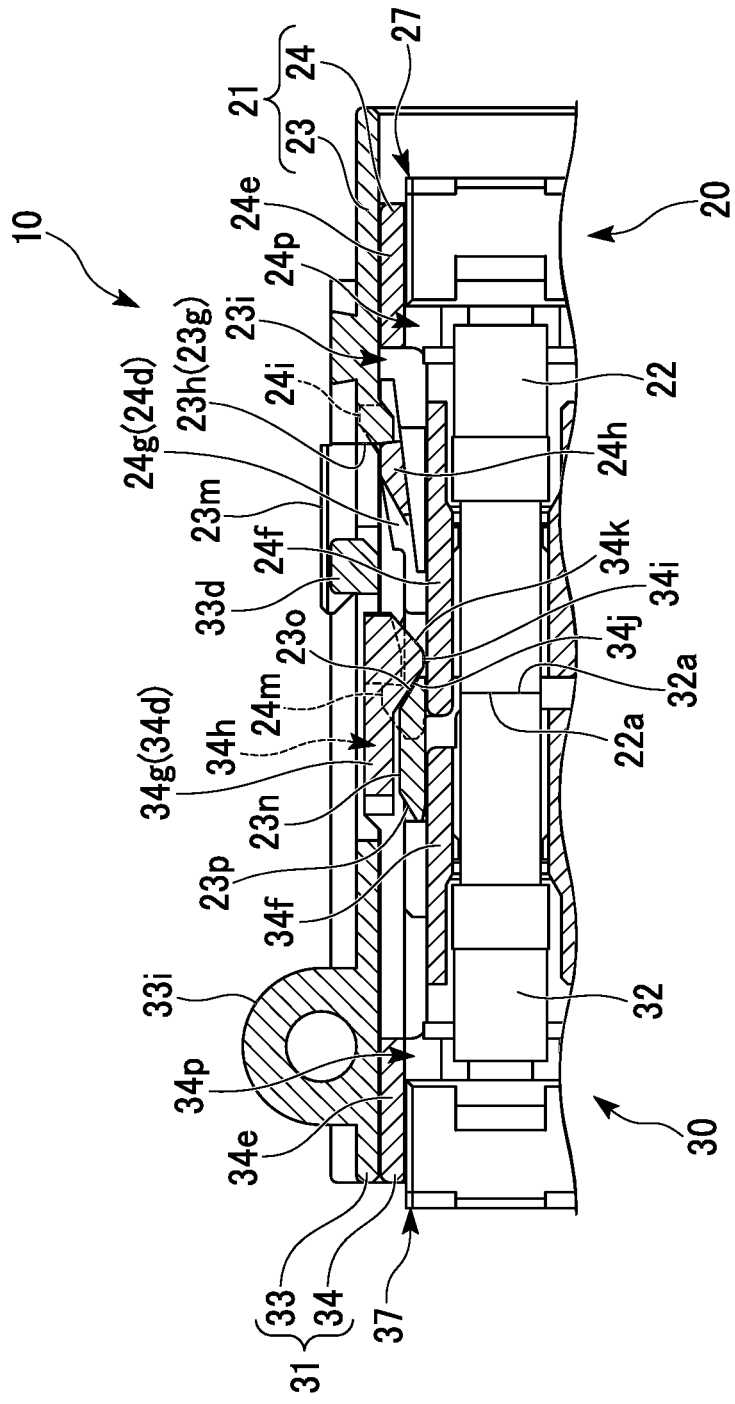
FIG. 8 is a cross-sectional view taken along line D-D in FIG. 7A.

When the movable side optical connector 30 is caused to advance toward the connector mounting wall 51 in order to mount the movable side optical connector 30 to the receiving side optical connector 20, first, as shown in FIGS. 7A, 7B, and 8, each of the locking releasing pieces 33g of the movable side outer housing 33 is inserted into the gap between the receiving side inner housing 24 (particularly, the base end portion of the elastic extension piece) and the receiving side outer housing 23 (particularly, the protection wall portion 23m). Subsequently, the pair of insertion protrusions 33h of the movable side outer housing 33 are respectively inserted into the pair of insertion cutouts 23q of the receiving side outer housing 23 (see FIG. 2). Accordingly, a positional deviation between the movable side outer housing 33 and the receiving side outer housing 23 in the horizontal width direction or in the vertical width direction can be suppressed.

Thereafter, the second ferrule 32 of the movable side optical connector 30 is butt-jointed to the first ferrule 22 of the receiving side optical connector 20. In addition, the pair of engaged pieces 34d of the movable side inner housing 34 are respectively engaged with the pair of engagement pieces 24m of the receiving side inner housing 24. Accordingly, the movable side housing 31 is fitted to the receiving side inner housing 24 of the receiving side housing 21.

Here, when the second ferrule 32 of the movable side optical connector 30 is butt-jointed to the first ferrule 22 of the receiving side optical connector 20, the pair of elastic locking pieces 24d are held in a state of being locked to the pair of restriction locking portions 23g, and the rearward movement of the receiving side inner housing 24 with respect to the receiving side outer housing 23 is restricted. Therefore, the ferrules 22 and 32 of the receiving side optical connector 20 and the movable side optical connector 30 are butt-jointed to each other through an appropriate abutting force based on the elastic biasing forces of the springs 26 and 36.

In addition, when the ferrules 22 and 32 of the receiving side optical connector 20 and the movable side optical connector 30 are butt-jointed to each other, the pair of positioning pins 22d of the first ferrule 22 are respectively inserted into the pair of positioning holes 32d of the second ferrule 32 such that the first ferrule 22 and the second ferrule 32 are positioned together.

The engagement between the engaged piece 34d of the movable side inner housing 34 and the engagement piece 24m of the receiving side inner housing 24 is performed as follows.

When the movable side optical connector 30 is caused to advance toward the receiving side optical connector 20, first, the elastic deformation protrusion 34i of the engaged piece 34d abuts the riding protrusion 23n of the receiving side housing 21 in the advance direction and then rides on the riding protrusion 23n. At this time, the engagement guide surfaces 23p and 34k of the riding protrusion 23n and the elastic deformation protrusion 34i abut each other, and thus the elastic deformation protrusion 34i can smoothly ride on the riding protrusion 23n. As the elastic deformation protrusion 34i rides on the riding protrusion 23n, the elastic extension piece 34g of the engaged piece 34d is elastically deformed toward the outside of the receiving side inner housing 24 in the vertical width direction, and the engagement hole 34h of the engaged piece 34d is positioned closer to the outside of the receiving side inner housing 24 in the vertical width direction than the engagement piece 24m.

Thereafter, the movable side optical connector 30 is caused to further advance toward the receiving side optical connector 20 so that the elastic deformation protrusion 34*i* of the engaged piece 34*d* is placed over the riding protrusion 23*n* of the receiving side housing 21 and then reaches the rear side of the riding protrusion 23*n*. At this time, the elastic extension piece 34*g* of the engaged piece 34*d* elastically returns to the inside of the receiving side inner housing 24 in the vertical width direction. Accordingly, the engagement piece 24*m* is inserted into the engagement hole 34*h* of the engaged piece 34*d*, and the engagement piece 24*m* and the engaged piece 34*d* are engaged with each other. In this engaged state, the elastic biasing forces of the springs 26 and 36 described above are applied in a direction such that the receiving side inner housing 24 and the movable side housing 31 become separated from each other, and thus the engagement piece 24*m* abuts the inner surface of the engagement hole 34*h*.

Furthermore, in order to mount the movable side optical connector 30 to the receiving side optical connector 20, after the second ferrule 32 is butt-jointed to the first ferrule 22 as described above and the engaged piece 34*d* of the movable side inner housing 34 is engaged with the engagement piece 24*m* of the receiving side inner housing 24, as shown in FIGS. 9A, 9B, and 10, the movable side optical connector 30 is caused to further advance toward the connector mounting wall 51.

At this time, the locking releasing piece 33*g* of the movable side housing 31 is pressed against the pressed protrusion 24*i* of the elastic locking piece 24*d* of the receiving side inner housing 24 so as to cause the elastic locking piece 24*d* to be elastically displaced toward the inside in the vertical width direction. Here, a surface of the pressed protrusion 24*i* which abuts on the locking releasing piece 33*g* is inclined toward the rear side of the receiving side inner housing 24 moving closer to the outside of the receiving side inner housing 24 in the vertical width direction, and thus the elastic locking piece 24*d* can be easily displaced toward the inside in the vertical width direction by pressing the locking releasing piece 33*g* against the pressed protrusion 24*i*.

When the elastic locking piece 24*d* is elastically displaced toward the inside in the vertical width direction, the locking claw 24*h* of the elastic locking piece 24*d* is displaced to be closer to the inside of the receiving side outer housing 23 in the vertical width direction than the locking surface 23*h*, and thus the locking state of the elastic locking piece 24*d* of the receiving side inner housing 24 and the restriction locking portion 23*g* of the receiving side outer housing 23 is released.

At this time, the receiving side inner housing 24 is moved rearward with respect to the receiving side outer housing 23 by the elastic biasing force of the spring 26 and the elastic locking piece 24*d* then is elastically returned as shown in FIG. 10 such that the locking claw 24*h* of the elastic locking piece 24*d* is inserted into the accommodation recess 23*i*.

As described above, the mounting of the movable side optical connector 30 to the receiving side optical connector 20 is completed.

As shown in FIGS. 9A, 9B, and 10, in a state where the movable side optical connector 30 is mounted to the receiving side optical connector 20, the receiving side inner housing 24 and the movable side housing 31 are movable in the forward and rearward directions with respect to the receiving side outer housing 23 within a predetermined range.

The receiving side inner housing 24 and the movable side housing 31 can advance with respect to the receiving side outer housing 23 toward the connector mounting wall 51 to a position where the tip end of the insertion protrusion 33*h* of the movable side outer housing 33 abuts the bottom portion (the end portion of the insertion cutout 23*q* on the rear side of the receiving side outer housing 23) of the insertion cutout 23*q* of the receiving side outer housing 23 (see FIG. 2). In addition, the receiving side inner housing 24 and the movable side housing 31 can retreat with respect to the receiving side outer housing 23 from the connector mounting wall 51 to a position where the locking claw 24*h* of the elastic locking piece 24*d* abuts the end portion of the rear side of the accommodation recess 23*i* of the receiving side outer housing 23.

In addition, in the state where the movable side optical connector 30 is mounted to the receiving side optical connector 20, the engaged piece 34*d* of the movable side inner housing 34 and the engagement piece 24*m* of the receiving side inner housing 24 are engaged with each other, and the receiving side inner housing 24 is integrally fixed to the movable side housing 31. Therefore, even when the movable side housing 31 is moved with respect to the receiving side outer housing 23 within a predetermined range, the ferrules 22 and 32 of the receiving side optical connector 20 and the movable side optical connector 30 are held in a state of being butt-jointed to each other by the elastic biasing forces of the springs 26 and 36.

Therefore, for example, even when an external force is suddenly applied to the movable side housing 31 in a direction retreating from the connector mounting wall 51, the release of the butt-jointing of the ferrules 22 and 32 of the receiving side optical connector 20 and the movable side optical connector 30 can be suppressed.

Next, an action of separating the movable side optical connector 30 from the receiving side optical connector 20 will be described.

In order to separate the movable side optical connector 30 from the receiving side optical connector 20 in the state shown in FIGS. 9A, 9B, and 10, when the movable side optical connector 30 is caused to retreat from the guide wall, first, the opposing surface 24*k* of the locking claw 24*h* of the receiving side inner housing 24 abuts the opposing surface 23*k* of the accommodation recess 23*i* of the receiving side outer housing 23 in the retreat direction. Therefore, when the movable side optical connector 30 is caused to further retreat from the connector mounting wall 51, the elastic locking piece 24*d* is elastically displaced toward the inside in the vertical width direction and thus the locking claw 24*h* comes out of the accommodation recess 23*i*.

Subsequently, the movable side optical connector 30 is caused to further retreat from the connector mounting wall 51 so that the elastic locking piece 24*d* is elastically returned as shown in FIGS. 7A, 7B, and 8 and the locking claw 24*h* of the elastic locking piece 24*d* is inserted into the window portion 23*f* of the receiving side outer housing 23. Accordingly, the locking claw 24*h* of the elastic locking piece 24*d* opposes the locking surface 23*h* of the receiving side outer housing 23. That is, the elastic locking piece 24*d* of the receiving side inner housing 24 is locked to the restriction locking portion 23*g* of the receiving side outer housing 23.

Thereafter, the movable side optical connector 30 is caused to further retreat from the connector mounting wall 51 so that the engaged state of the engaged piece 34*d* of the movable side inner housing 34 and the engagement piece 24*m* of the receiving side inner housing 24 is released. The releasing of the engagement between the engaged piece 34*d* and the engagement piece 24*m* is performed as follows.

When the movable side optical connector 30 is caused to retreat from the connector mounting wall 51 in the state shown in FIGS. 7A, 7B, and 8, first, the elastic deformation protrusion 34*i* of the engaged piece 34*d* abuts the riding protrusion 23*n* of the receiving side housing 21 in the retreat direction and then rides on the riding protrusion 23n. At this time, the engagement releasing guide surfaces 23o and 34j of the riding protrusion 23n and the elastic deformation protrusion 34i abut each other, and thus the elastic deformation protrusion 34i can smoothly ride on the riding protrusion 23n. As the elastic deformation protrusion 34i rides on the riding protrusion 23n, the elastic extension piece 34g of the engaged piece 34d is elastically deformed toward the outside of the receiving side inner housing 24 in the vertical width direction, and the engagement hole 34h of the engaged piece 34d is positioned closer to the outside of the receiving side inner housing 24 in the vertical width direction than the engagement piece 24m. Accordingly, the engagement piece 24m of the receiving side inner housing 24 comes out of the engagement hole 34h of the engaged piece 34d.

Subsequently, when the movable side optical connector 30 is caused to further retreat from the connector mounting wall 51, the elastic deformation protrusion 34i of the engaged piece 34d is placed over the riding protrusion 23n of the receiving side housing 21 and then reaches the front side of the riding protrusion 23n, and the elastic extension piece 34g of the engaged piece 34d elastically returns to the inside of the receiving side inner housing 24 in the vertical width direction. At the position where the elastic extension piece 34g is elastically returned, the engagement hole 34h of the engaged piece 34d is positioned to be shifted from the engagement piece 24m in the retreat direction, and thus the engagement piece 24m is not inserted into the engagement hole 34h of the engaged piece 34d.

Accordingly, the engaged state of the engaged piece 34d of the movable side inner housing 34 and the engagement piece 24m of the receiving side inner housing 24 is released, and the separation of the movable side optical connector 30 from the receiving side optical connector 20 is completed.

As described above, in the optical connector 10 of this embodiment, in the receiving side housing 21, each of the pair of engagement pieces 24m, the pair of elastic locking pieces 24d, and the pair of restriction locking portions 23g are arranged in the vertical width direction of the receiving side housing 21. In addition, in the movable side housing 31, each of the pair of engaged pieces 34d and the pair of locking releasing pieces 33g are arranged in the vertical width direction of the movable side housing 31.

That is, according to the optical connector 10 of this embodiment, the gap between the receiving side inner housing 24 and the receiving side outer housing 23 into which the locking releasing piece 33g is inserted is not disposed in the horizontal width direction of the receiving side outer housing 23 unlike the related art. Therefore, the dimensions of the receiving side housing 21 in the horizontal width direction can be set to be small. Therefore, a reduction in the size of the receiving side housing 21 can be easily realized.

In addition, according to the optical connector 10 of this embodiment, the engagement piece 24m and the elastic locking piece 24d of the receiving side inner housing 24 are inserted into the window portion 23f of the receiving side outer housing 23, and thus the dimensions of the receiving side housing 21 in the vertical width direction can be set to be small.

Furthermore, according to the optical connector 10 of this embodiment, the engagement piece 24m of the receiving side inner housing 24 is disposed closer to the front side of the receiving side inner housing 24 than the elastic locking piece 24d, and the locking releasing piece 33g of the movable side housing 31 is disposed closer to the front side of the movable side housing 31 than the engaged piece 34d. Accordingly, even when the pair of engagement pieces 24m, the pair of elastic locking pieces 24d, and the pair of restriction locking portions 23g of the receiving side housing 21 and the pair of engaged pieces 34d and the pair of locking releasing pieces 33g of the movable side housing 31 are arranged in the vertical width direction, the attachment and the detachment of the movable side optical connector 30 to and from the receiving side optical connector 20 can be easily realized.

In addition, according to the optical connector 10 of this embodiment, since the engaged piece 34d of the receiving side inner housing 34 is inserted into the movable side window portion 33f of the movable side outer housing 33, the locking releasing pieces 33g formed in the movable side outer housing 33 can be arranged on the front side of the movable side housing 31 with respect to the engaged piece 34d. In addition, the dimensions of the receiving side housing 21 in the vertical width direction can be set to be small.

Second Embodiment

Next, a second embodiment of the optical connector according to the present invention will be described with reference to FIGS. 11 to 13. In the second embodiment, like elements similar to those of the first embodiment are denoted by like reference numerals, and the detailed description thereof will be omitted.

Figure 11:
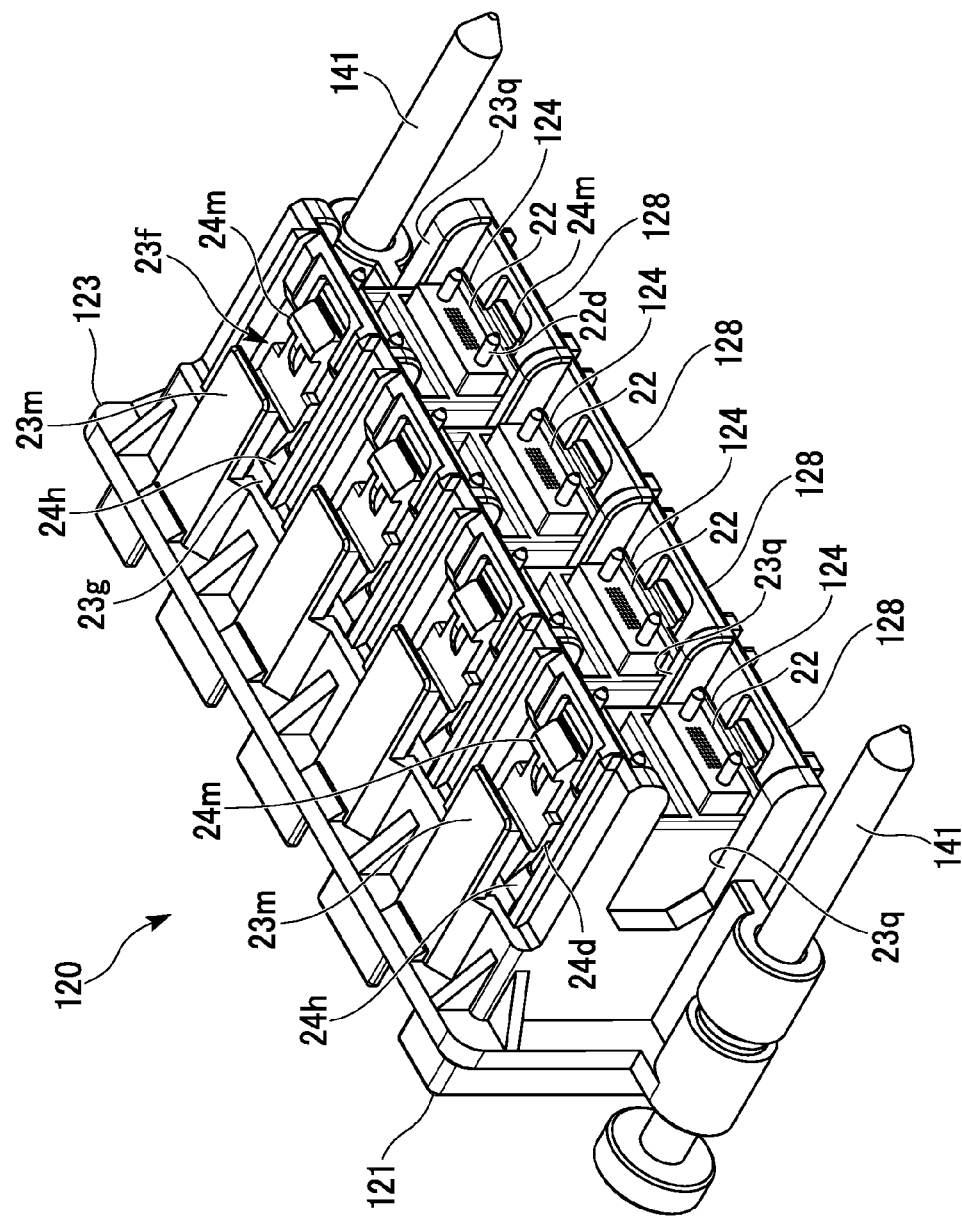
FIG. 11 is a perspective view showing the exterior of a receiving side optical connector of an optical connector according a second embodiment of the present invention.
Figure 12:
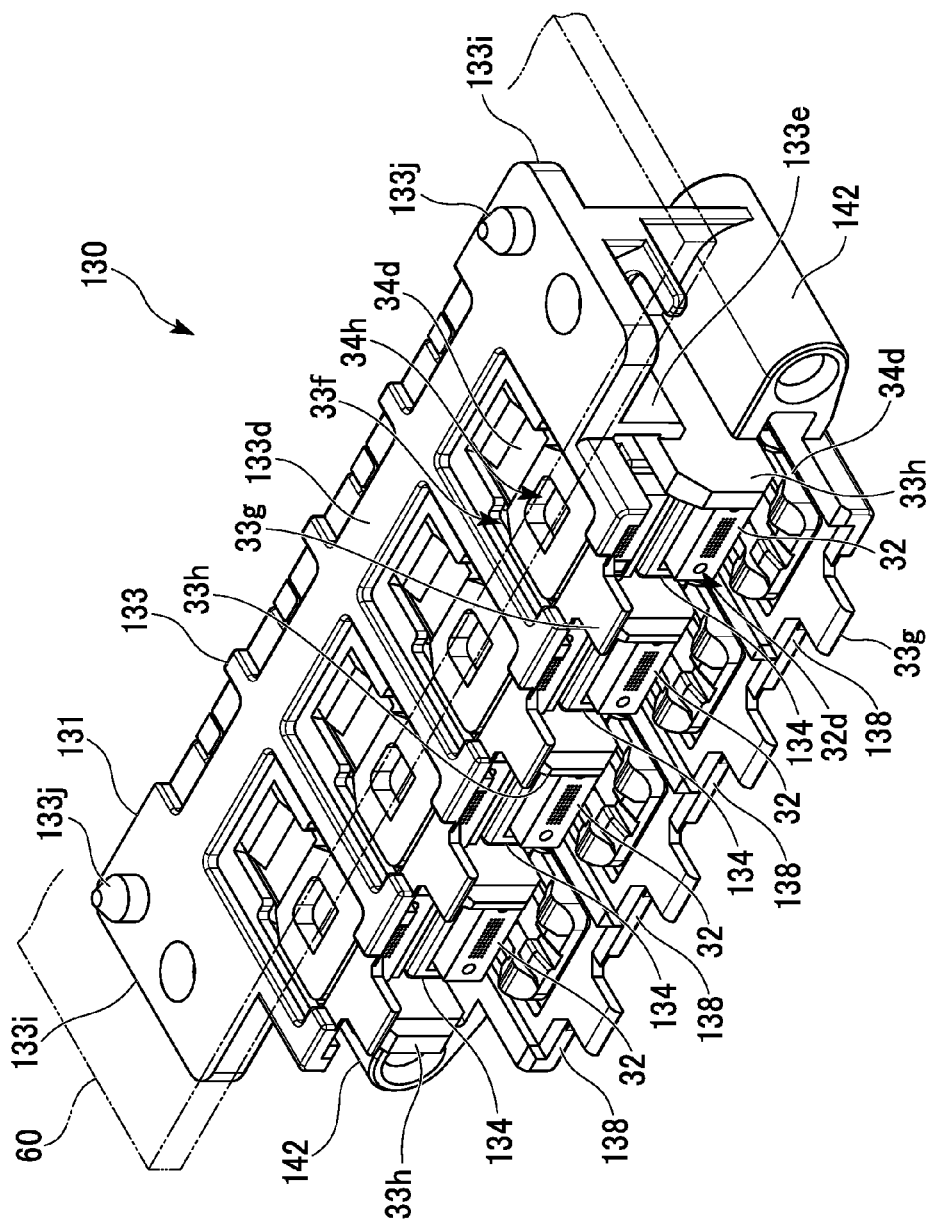
FIG. 12 is a perspective view showing the exterior of a movable side optical connector of the optical connector according the second embodiment of the present invention.
Figure 13:
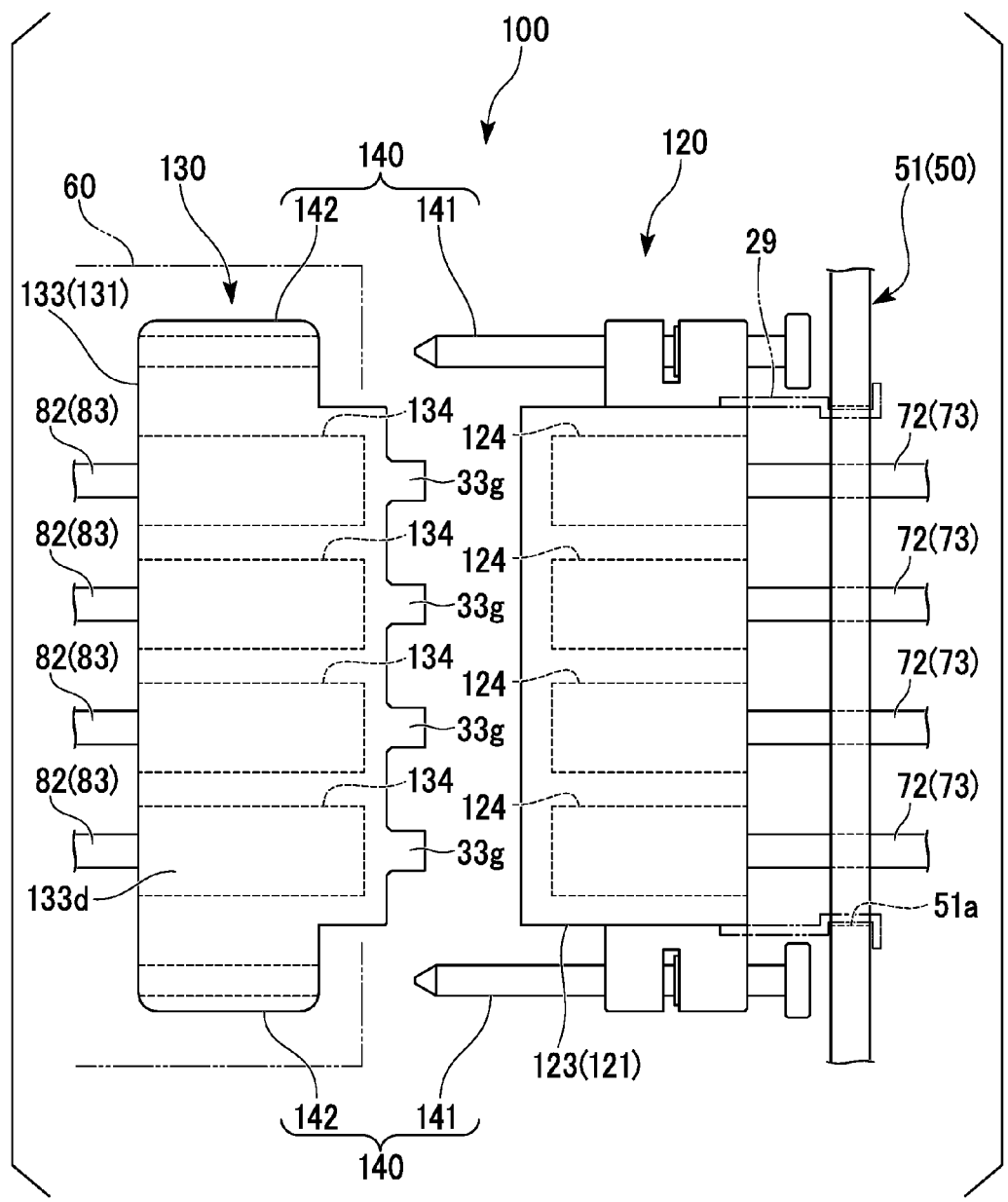
FIG. 13 is a schematic plan view showing a state where the movable side optical connector of FIG. 12 is separated from the receiving side optical connector of FIG. 11.

As in the first embodiment, an optical connector 100 of this embodiment shown in FIGS. 11 to 13 includes a receiving side optical connector 120 (first optical connector) which is mounted on the connector mounting wall 51 of the plug-in unit 50, and a movable side optical connector 130 (second optical connector) which is mounted on the printed board 60 that can be inserted into and separated from the plug-in unit 50.

As shown in FIG. 11, the receiving side optical connector 120 includes a receiving side housing 121 as in the first embodiment. The receiving side housing 121 includes a receiving side outer housing 123 (outer housing) and a receiving side inner housing 124 (inner housing) as in the first embodiment.

The configuration of the receiving side inner housing 124 is the same as that of the receiving side inner housing 24 of the first embodiment. However, the receiving side optical connector 120 includes a plurality of (in the shown example, four) receiving side inner housings 124. The receiving side outer housing 123 is configured such that a plurality of (in the shown example, four) receiving side outer housing units 128 which are the same as the receiving side outer housing 23 of the first embodiment are arranged in the horizontal width direction and the plurality of receiving side outer housing units 128 are integrally fixed to each other. Therefore, the receiving side outer housing 123 is formed in an angular tube shape in which the dimensions in the vertical width direction are smaller than the dimensions in the horizontal width direction.

One of the plurality of receiving side inner housings 124 is accommodated in one of the plurality of receiving side outer housing units 128. That is, in the receiving side outer housing 123, the plurality of receiving side inner housings 124 are accommodated in a state of being arranged in the horizontal width direction of the receiving side outer housing 123.

As shown in FIG. 13, as in the first embodiment, the receiving side optical connector 120 is mounted with the mounting member 29 so as to protrude from one surface side of connector mounting wall 51.

As shown in FIG. 12, as in the first embodiment, the movable side optical connector 130 includes a movable side housing 131. The movable side housing 131 includes a movable side outer housing 133 and a movable side inner housing 134 as in the first embodiment.

The configuration of the movable side inner housing 134 is the same as that of the movable side inner housing 34 of the first embodiment. However, the movable side optical connector 130 includes a plurality of (in the shown example, four) movable side inner housings 134.

The movable side outer housing 133 is configured such that a plurality of (in the shown example, four) movable side outer housing units 138 which are the same as the movable side outer housing 33 of the first embodiment are arranged in the horizontal width direction and the plurality of movable side outer housing units 138 are integrally fixed to each other. Therefore, the movable side outer housing 133 is formed in an angular tube shape in which the dimensions in the vertical width direction are smaller than the dimensions in the horizontal width direction. The movable side outer housing 133 includes end plate portions 133d on both sides in the vertical width direction and side plate portions 133e on both sides in the horizontal width direction.

One of the plurality of movable side inner housings 134 is accommodated in one of the plurality of movable side outer housing units 138. That is, in the movable side outer housing 133, the plurality of movable side inner housings 134 are accommodated in a state of being arranged in the horizontal width direction of the movable side outer housing 133.

The movable side optical connector 130 is mounted on the printed board 60 so that the vertical width direction of the movable side outer housing 133 is perpendicular to the thickness direction of the printed board 60, that is, the pair of end plate portions 133d of the movable side outer housing 133 are parallel to the printed board 60 and one of the pair of end plate portions 133d of the movable side outer housing 133 opposes the printed board 60.

Accordingly, in this embodiment, the pair of guide walls 52 and 53 (see FIG. 1) of the plug-in unit 50 on which the receiving side optical connector 120 is mounted are arranged in the horizontal width direction of the receiving side outer housing 123.

The movable side optical connector 130 is mounted on the printed board 60 with the mounting member as in the first embodiment. The mounting member in this embodiment is a screw (not shown).

Therefore, the movable side outer housing 133 of this embodiment includes a screw insertion portion 133i into which the shaft portion of the screw is inserted. The screw insertion portions 133i are provided on both sides of the movable side outer housing 133 in the horizontal width direction so that the axis direction of the screw insertion portion 133i is coincident with the horizontal width direction of the movable side outer housing 133. The screw insertion portions 133i in the shown example have plate-like shapes and are arranged on the same plane as that of the outer surface of one end plate portion 133d of the movable side outer housing 133 that opposes the printed board 60.

In addition, the movable side outer housing 133 of this embodiment includes a positioning protrusion 133j which is the same as that of the first embodiment. The positioning protrusions 133j are arranged on both sides of the movable side outer housing 133 in the horizontal width direction. The positioning protrusion 133j in the shown example protrudes from the surface of the screw insertion portions 133i which is on the same plane as that of the outer surface of one end plate portion 133d, and for example, may protrude from the outer surface of one end plate portion 133d.

Furthermore, as shown in FIGS. 11 to 13, the optical connector 100 of this embodiment includes a positioning structure 140 for positioning the movable side outer housing 133 with respect to the receiving side outer housing 123 when the movable side optical connector 130 is mounted to the receiving side optical connector 120. The positioning structure 140 includes a housing positioning pin 141 which is provided in one of the movable side outer housing 133 and the receiving side outer housing 123, and a positioning pin insertion portion 142 which is provided in the other of the movable side outer housing 133 and the receiving side outer housing 123. In the optical connector 100 in this embodiment, the housing positioning pin 141 is provided in the receiving side outer housing 123, and the positioning pin insertion portion 142 is provided in the movable side outer housing 133.

The housing positioning pins 141 are provided in both end portions of the receiving side outer housing 123 in the horizontal width direction. The housing positioning pins 141 extend in the forward and rearward directions of the receiving side housing 121 so as to protrude forward from the front end of the receiving side housing 121. In addition, the housing positioning pins 141 are held in the receiving side outer housing 123 so that slight play with respect to the receiving side outer housing 123 is allowed.

The positioning pin insertion portions 142 are provided on both sides of the movable side outer housing 133 in the horizontal width direction. The end portion of the positioning pin insertion portion 142 on the front side of the movable side outer housing 133 in the shown example is positioned closer to the rear side than the front end of the movable side outer housing 133, but the position is not limited thereto.

In the optical connector 100 of this embodiment configured as above, an action of attaching and detaching the movable side optical connector 130 to and from the receiving side optical connector 120 is the same as that of the first embodiment.

However, in this embodiment, when the mount the movable side optical connector 130 is caused to advance toward the connector mounting wall 51 in order to mount the movable side optical connector 130 to the receiving side optical connector 120, first, the housing positioning pins 141 are inserted into the positioning pin insertion portions 142. Accordingly, the movable side outer housing 133 is roughly positioned with respect to the receiving side outer housing 123. Thereafter, as in the first embodiment, each of the locking releasing pieces 33g of the movable side outer housing 133 is inserted into the gap between the receiving side inner housing 124 and the receiving side outer housing 123, and the subsequent process follows.

In the optical connector 100 of this embodiment, the same effect as that of the first embodiment is exhibited.

In addition, in the optical connector 100 of this embodiment, as in the first embodiment, in the receiving side housing 121, each of the pair of engagement pieces 24m, the pair of elastic locking pieces 24d, and the pair of restriction locking portions 23g are arranged in the vertical width direction of the receiving side housing 121. In addition, in the movable side housing 131, each of the pair of engaged pieces 34d and the pair of locking releasing pieces 33g are arranged in the vertical width direction of the movable side housing 131. Therefore, the plurality of receiving side inner housings 124 can be easily arranged in the horizontal width direction of the receiving side outer housing 123. In other words, the receiving side outer housing 123 which accommodates the plurality of receiving side inner housings 124 can be easily manufactured.

While the embodiments of the present invention have been described in detail with reference to the drawings, the configurations in each of the embodiments and combinations thereof are merely examples, and additions, omissions, substitutions, and changes in the configurations can be made without departing from the spirit of the present invention.

For example, in the first embodiment or the second embodiment described above, the positioning pins may be provided in the second ferrule 32, and the positioning holes may be provided in the first ferrule 22.

The movable side outer housing and the movable side inner housing which are included in the movable side housing may be, for example, formed integrally with each other.

The engagement piece of the receiving side inner housing may include, for example, an engagement hole which is recessed from the outer circumference of the receiving side inner housing toward the inside. In this case, in the tip end portion of the engaged piece of the movable side housing in the extension direction thereof, an engagement protrusion which protrudes toward the inside of the movable side outer housing in the vertical width direction and is inserted into the engagement hole of the receiving side inner housing may be formed.

For example, the receiving side optical connector may also be mounted on a connector support member other than the connector mounting wall 51.

Also, the movable side optical connector may also be mounted on a connector support member other than the printed board 60.

In addition, for example, the movable side optical connector may not be mounted on the connector support member. In this case, an operator may grip the movable side optical connector and attach or detach the movable side optical connector to or from the receiving side optical connector.

The specific configuration of the optical connector is not limited as long as the configuration is compatible with the technical spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical connector comprising:
   a first housing;
   a first ferrule which is embedded in the first housing;
   a second housing which is detachably fitted to the first housing; and
   a second ferrule which is embedded in the second housing and is butt-jointed to the first ferrule when the second housing is fitted to the first housing,
   wherein the first housing includes a tubular outer housing, and a tubular inner housing which is accommodated in the outer housing to be movable in a center axis direction of the outer housing and which accommodates the first ferrule,
   a pair of engagement pieces which are arranged in a vertical width direction perpendicular to the center axis direction of the outer housing are formed in the inner housing,
   a pair of engaged pieces which are arranged in the vertical width direction and are respectively engaged with the engagement pieces so as to allow the second housing to be fitted to the inner housing are formed in the second housing,
   a pair of elastic locking pieces which are arranged in the vertical width direction is provided in an outer circumference of the inner housing,
   a pair of restriction locking portions which are arranged in the vertical width direction and are respectively locked to the pair of elastic locking pieces in a state where the second housing is separated from the first housing so as to restrict movement of the inner housing with respect to the outer housing are formed in the outer housing, and
   a pair of locking releasing pieces which are arranged in the vertical width direction while extending toward the first housing, and allow the pair of elastic locking pieces to be elastically displaced toward the inside by further moving the second housing toward the first housing side in a state where the pair of engagement pieces are engaged with the pair of engaged pieces so as to release a state where the pair of restriction locking portions and the pair of elastic locking pieces are locked, are formed in the second housing.

2. The optical connector according to claim 1,
   wherein a pair of window portions which are arranged in the vertical width direction to expose the inner housing to an outside are formed in the outer housing, and
   the engagement piece and the elastic locking piece of the inner housing are inserted into each of the window portions.

3. The optical connector according to claim 1,
   wherein the engagement piece is disposed closer to a front side of the inner housing in a center axis direction thereof than the elastic locking piece.

4. The optical connector according to claim 1,
   wherein the locking releasing piece is disposed closer to a front side of the second housing in a center axis direction thereof than the engaged piece.

5. The optical connector according to claim 1,
   wherein, in one of the first ferrule and the second ferrule, a pair of positioning pins which protrude from an end surface to be butt-jointed is provided,
   in the other of the first ferrule and the second ferrule, a pair of positioning holes into which the pair of positioning pins are respectively inserted in a state where the first ferrule and the second ferrule are butt-jointed to each other to allow the first ferrule and the second ferrule to be positioned are provided, and
   the pair of positioning pins or the pair of positioning holes provided in the first ferrule is arranged with an interval in a horizontal width direction therebetween perpendicular to the center axis direction and the vertical width direction.

6. The optical connector according to claim 1,
   wherein a plurality of inner housings is accommodated in the outer housing in a state of being arranged in the horizontal width direction which is perpendicular to the center axis direction and the vertical width direction.

7. The optical connector according to claim 1,
   wherein the first housing is mounted on a connector mounting wall, and
   the second housing is mounted on a printed board which is able to advance toward and retreat from the connector mounting wall.

* * * * *